(12) United States Patent
Colber et al.

(10) Patent No.: US 12,439,849 B2
(45) Date of Patent: Oct. 14, 2025

(54) POWER TOOL HAVING A VARIABLE HEIGHT OR SPEED

(71) Applicant: TECHTRONIC CORDLESS GP, Anderson, SC (US)

(72) Inventors: William E. Colber, Lavonia, GA (US); Dayu Feng, Seneca, SC (US); James C. Ferrell, Elberton, GA (US); Jonathan R. Feldkamp, Anderson, SC (US); Dongyu Wang, Hendersonville, TN (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 224 days.

(21) Appl. No.: 18/244,002

(22) Filed: Sep. 8, 2023

(65) Prior Publication Data

US 2023/0413725 A1    Dec. 28, 2023

Related U.S. Application Data

(63) Continuation of application No. 16/774,785, filed on Jan. 28, 2020, now abandoned.

(60) Provisional application No. 62/799,437, filed on Jan. 31, 2019.

(51) Int. Cl.
*A01D 34/82* (2006.01)
*A01D 34/68* (2006.01)
*A01D 34/74* (2006.01)

(52) U.S. Cl.
CPC .......... *A01D 34/824* (2013.01); *A01D 34/68* (2013.01); *A01D 34/74* (2013.01)

(58) Field of Classification Search
CPC ....... A01D 34/824; A01D 34/74; A01D 34/68
See application file for complete search history.

(56) References Cited

U.S. PATENT DOCUMENTS

| | | | |
|---|---|---|---|
| 1,441,144 A * | 1/1923 | Cutler | A01D 34/62 |
| | | | 56/DIG. 18 |
| 2,986,402 A * | 5/1961 | Winton | A01D 34/74 |
| | | | 280/43.13 |
| 3,357,716 A | 12/1967 | Musichuk | |
| 3,702,016 A | 11/1972 | Keese | |
| 4,216,643 A * | 8/1980 | Malone | A01D 34/828 |
| | | | 56/320.1 |
| 4,232,565 A | 11/1980 | Leonheart | |
| 4,300,334 A * | 11/1981 | Hines | A01D 76/003 |
| | | | 56/320.1 |
| 4,316,355 A | 2/1982 | Hoff | |
| 4,362,228 A | 12/1982 | Plamper et al. | |
| 4,453,372 A | 6/1984 | Remer | |
| 4,525,989 A | 7/1985 | Lane et al. | |

(Continued)

FOREIGN PATENT DOCUMENTS

| | | |
|---|---|---|
| CN | 201557390 U | 8/2010 |
| EP | 3471126 A1 | 4/2019 |

(Continued)

*Primary Examiner* — Sean M Michalski
(74) *Attorney, Agent, or Firm* — Dority & Manning, P.A.

(57) ABSTRACT

A power tool may have features for varying height or speed. The power tool may include a base chassis, one or more wheels mounted to the base chassis, and a handle frame attached to the base chassis. A slider assembly or support rail may further be included with the power tool to, for instance, aid in varying speed or height.

20 Claims, 21 Drawing Sheets

(56) References Cited

U.S. PATENT DOCUMENTS

| | | | |
|---|---|---|---|
| 4,835,952 A * | 6/1989 | McLane | A01D 34/74 |
| | | | 280/43.13 |
| 4,879,867 A | 11/1989 | Wenzel | |
| 4,885,903 A | 12/1989 | Scag | |
| 4,940,184 A | 7/1990 | Smrt | |
| 5,163,275 A | 11/1992 | Hare et al. | |
| 5,209,051 A | 5/1993 | Langdon | |
| 5,297,379 A | 3/1994 | Smith | |
| 5,355,662 A | 10/1994 | Schmidt | |
| 5,483,788 A | 1/1996 | Fassauer | |
| 5,542,241 A | 8/1996 | Lydy et al. | |
| 5,771,670 A | 6/1998 | Perry | |
| 6,195,969 B1 | 3/2001 | Yilmaz | |
| 6,449,935 B1 | 9/2002 | Nicolay et al. | |
| D711,432 S | 8/2014 | Holt | |
| 9,179,597 B1 | 11/2015 | Kaspar et al. | |
| 9,651,138 B2 | 5/2017 | Helin et al. | |
| 9,855,490 B2 | 1/2018 | McGuffie | |
| 10,485,167 B2 | 11/2019 | Smith | |
| 11,102,924 B2 | 8/2021 | Xiao et al. | |
| 11,558,998 B2 | 1/2023 | Yuan et al. | |
| 11,622,501 B2 * | 4/2023 | Steiner | A01D 34/662 |
| | | | 56/17.1 |
| 2002/0073672 A1 | 6/2002 | Yilmaz | |
| 2002/0189225 A1 | 12/2002 | Nicolay et al. | |
| 2003/0182919 A1 | 10/2003 | Baumann et al. | |
| 2005/0144919 A1 | 7/2005 | Osborne | |
| 2008/0029278 A1 | 2/2008 | Wynings | |
| 2009/0107095 A1 | 4/2009 | Kaskawitz et al. | |
| 2013/0186698 A1 | 7/2013 | Sarokhan et al. | |
| 2013/0199147 A1 | 8/2013 | Akahane | |
| 2013/0305675 A1 | 11/2013 | Pare | |
| 2015/0101301 A1 | 4/2015 | Yamaoka et al. | |
| 2015/0290673 A1 | 10/2015 | Duncan | |
| 2016/0206950 A1 * | 7/2016 | Peter Mcguffie | A63C 19/065 |
| 2019/0075726 A1 | 3/2019 | White et al. | |
| 2020/0329638 A1 | 10/2020 | Yuan et al. | |
| 2021/0037701 A1 | 2/2021 | Kaskawitz et al. | |
| 2023/0034760 A1 | 2/2023 | Fu et al. | |

FOREIGN PATENT DOCUMENTS

| | | |
|---|---|---|
| WO | WO2017215604 A1 | 12/2017 |
| WO | WO2018237251 A1 | 12/2018 |

* cited by examiner

POWER TOOL HAVING A VARIABLE HEIGHT OR SPEED

This application is a continuation of U.S. patent application Ser. No. 16/774,785, filed on Jan. 28, 2020, which claims the benefit of priority to U.S. Provisional Patent Application No. 62/799,437, filed on Jan. 31, 2019, the disclosure of which is incorporated by reference herein in its entirety.

FIELD OF THE INVENTION

The present subject matter relates generally to a power tools, such as a lawnmower, having one or more features for varying a height or travel speed of the power tool.

BACKGROUND OF THE INVENTION

Power tools, such as a user directed lawnmowers (e.g., push mowers or self-propelled mowers) often include a handle assembly that extends from a deck of the power tool. A cutting blade, such as a radial blade or reel, may be mounted to the deck to trim vegetation, such as grass. Generally, multiple wheels are mounted to the deck to provide support and, in some instances, define the cutting height for the blade. During use, a user may grasp the handle to push or guide the power tool or lawnmower as the cutting blade trims vegetation beneath the deck. Thus, the user's hands remain on the handle assembly as the user walks behind the deck.

One of the long-standing difficulties in, for example, user directed lawnmowers involves accounting for the variations in the environment or manner in which the lawnmowers being used. Based on various factors, such as vegetation type (e.g., type of grass), soil, and lawn topography, it may be preferable or advantageous to change the height at which the cutting blade is held relative to the ground. Similarly, it may also be difficult to accommodate users of different heights, sizes, and use preferences. As an example, a handle height that is comfortable for a relatively short person may be uncomfortable for a relatively tall person. However, many existing lawnmowers only include features for limited adjustment if any, to the handle. As another example, the size or positioning of the handle assembly may create difficulties for storing a lawnmower in a particular space. By extending backwards from the deck, the handle assembly of lawnmower often greatly increases the footprint or square footage required to store a lawnmower appliance (e.g., without separating the handle assembly from the deck).

In the case of self-propelled lawnmowers, a motor or transmission is often provided to rotate (or assist rotation of) at least one of the wheels. However, additional difficulties may arise in controlling the speed at which the lawnmower is propelled (i.e., the rotational velocity or power generated at one or more of the wheels). Many existing lawnmowers only include a single speed setting. Even lawnmowers that permit the selection of multiple speed settings generally make it difficult or unnatural to change the speed setting while using lawnmower or moving the lawnmower forward. Often, a user must stand still or take his hands from the handle assembly to select a speed-setting button or switch at a different portion of lawnmower. This can be especially cumbersome or frustrating for users, especially after extended use of lawnmower.

As a result, it would be advantageous to provide a power tool including features for addressing one or more of the above identified issues

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a power tool is provided. The power tool may include a base chassis, a propulsion wheel mounted to the base chassis, a propulsion motor, and a handle frame. The propulsion motor may be in mechanical communication with the propulsion wheel to selectively motivate the base chassis. The handle frame may be attached to the base chassis and extend from a mount end to a grip end. The handle frame may include a slider assembly. The slider assembly may be located between the mount end and the grip end. The slider assembly may include a reception tube and an insertion tube longitudinally slidable relative to the reception tube to vary a longitudinal distance between the grip end and the mount end from a rest position to an engaged position.

In another exemplary embodiment of the present disclosure, a power tool is provided. The power tool may include a base chassis, a handle frame, a first wheel, a second wheel, a wheel bracket, a secondary bracket, and a support rail. The handle frame may be attached to the base chassis and extend from a mount end to a grip end. The first wheel may be mounted to the base chassis. The second wheel may be transversely spaced apart from the first wheel. The wheel bracket may define a plurality of slots corresponding to a plurality of unique height settings of the first wheel. The secondary bracket may be mounted to the second wheel. The support rail may extend transversely from a first pivotable end proximal to the wheel bracket to a second pivotable end proximal to the secondary bracket.

In yet another exemplary embodiment of the present disclosure, a power tool is provided. The power tool may include a base chassis, a first wheel, a second wheel, a use-angle assembly, and a handle frame. The first wheel may be mounted to the base chassis. The first wheel may be rotatable about a wheel axis. The second wheel may be transversely spaced apart from the first wheel. The use-angle assembly may be attached to the base chassis and define a handle rotation axis parallel to the wheel axis. The handle frame may be attached to the base chassis at the use-angle assembly and extend from a mount end proximal to the use-angle assembly to a grip end distal to the use angle assembly. The use-angle assembly may include a support bracket, an intermediate cup, and a handle bracket. The support bracket may be fixed to the base chassis. The intermediate cup may be attached to the support bracket. The intermediate cup may define a plurality of cup ridges. The handle bracket may be fixed to the handle frame in selective engagement with the intermediate cup. The handle bracket may define a plurality of bracket ridges extending laterally toward the intermediate cup in selective engagement with the plurality of cup ridges.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a lawnmower according to exemplary embodiments of the present disclosure.

DETAILED DESCRIPTION

Figure 1:
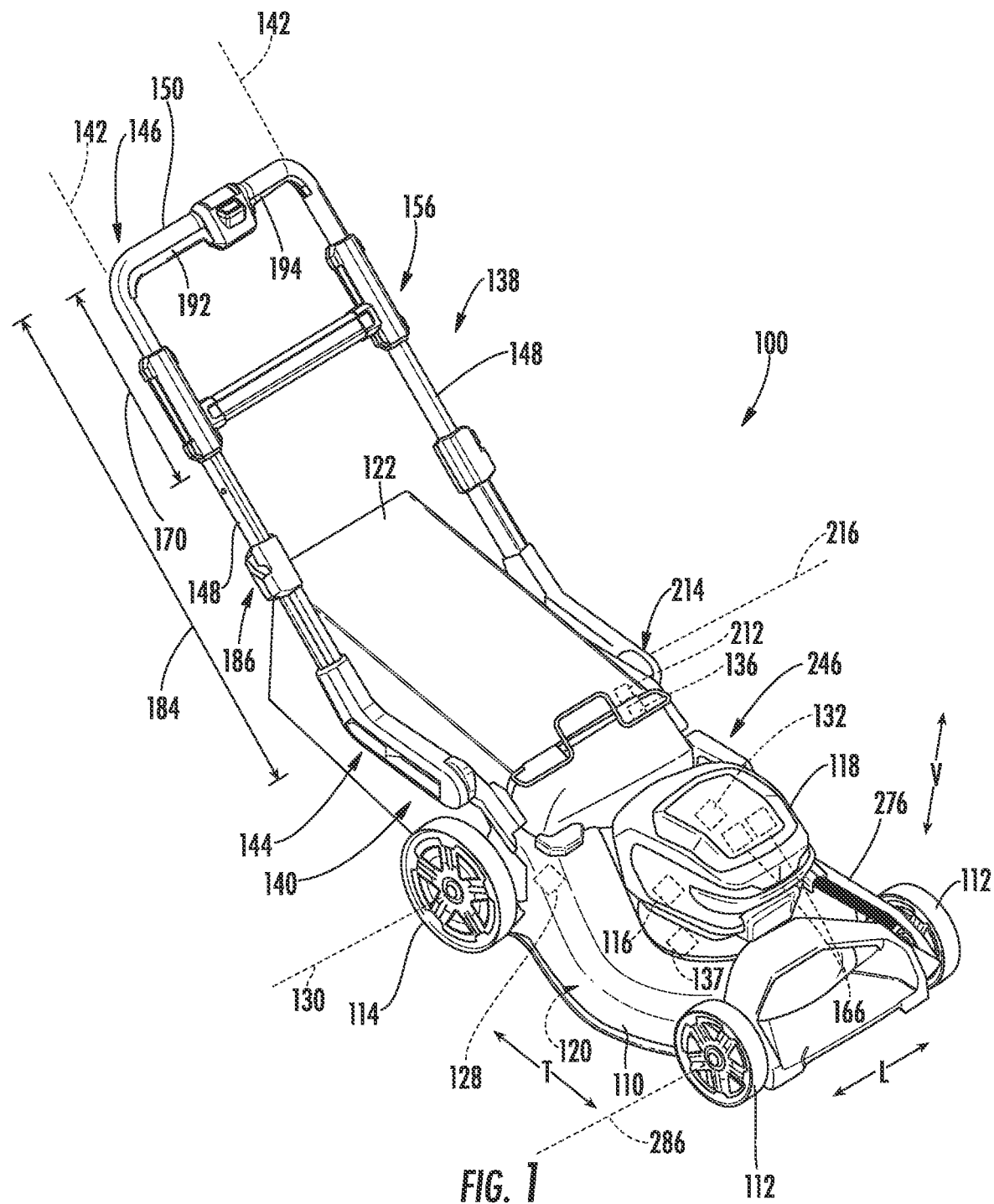
Figure 2:
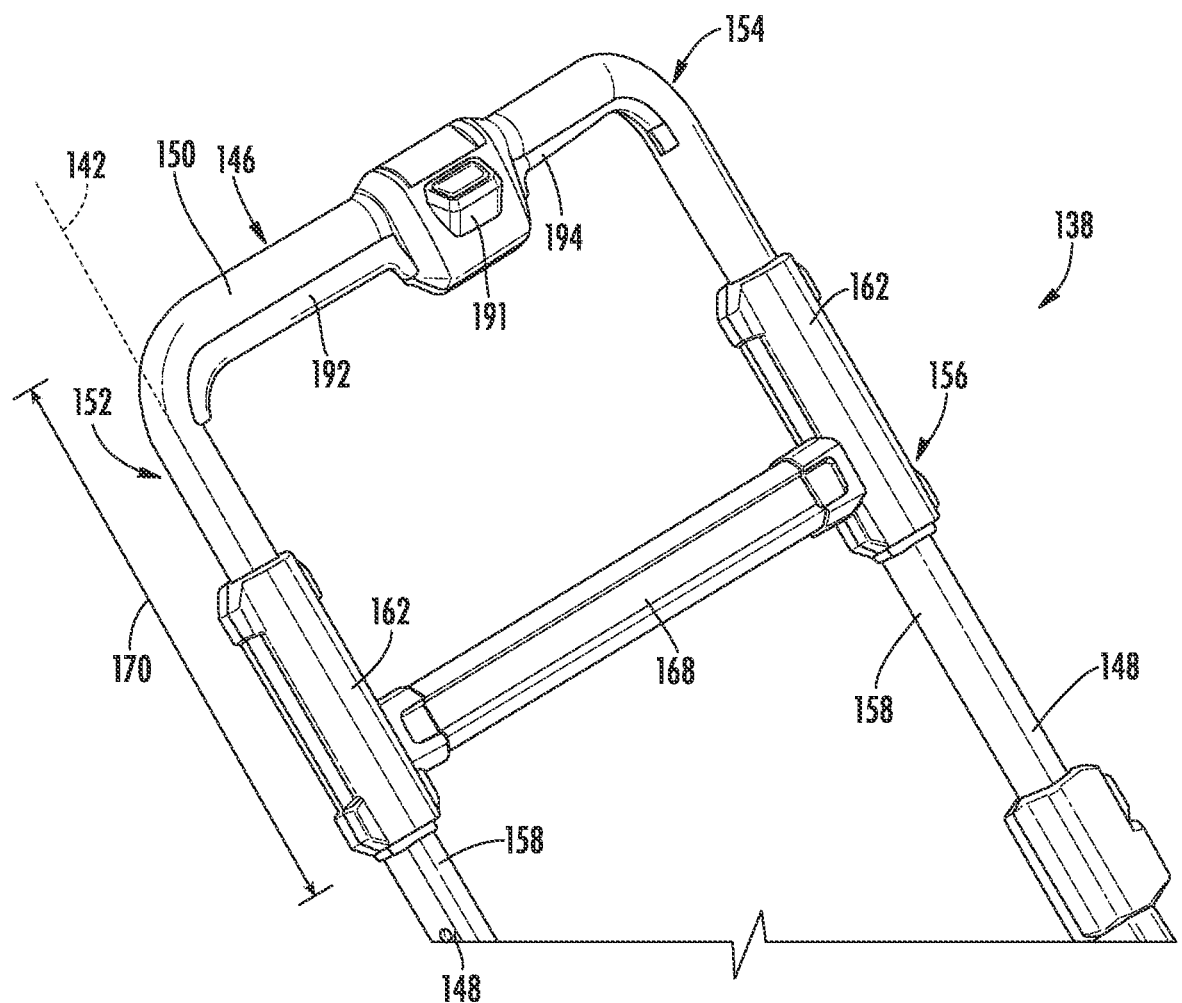
FIG. 2 provides a perspective view of a portion of a handle assembly of a lawnmower according to exemplary embodiments of the present disclosure.
Figure 3:
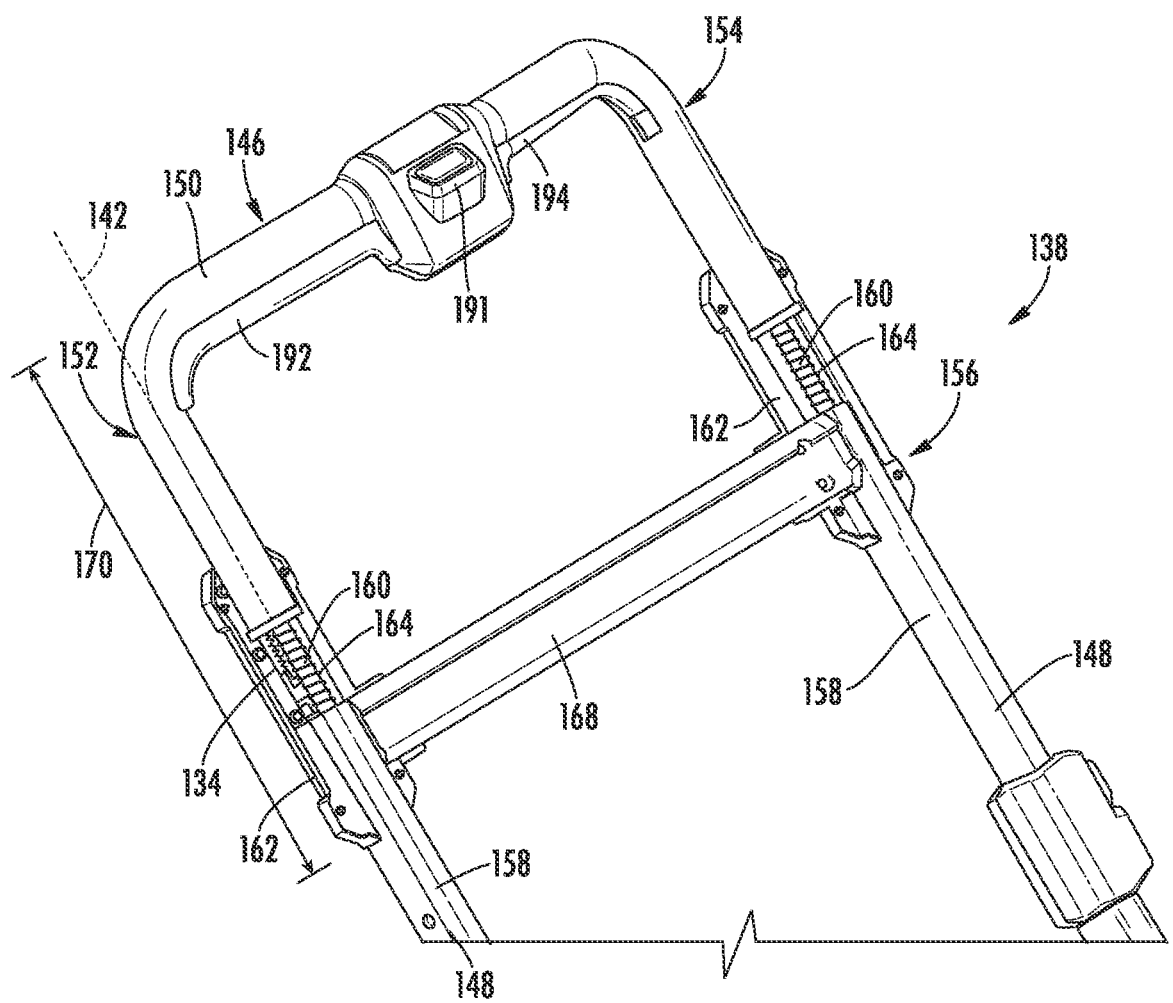
FIG. 3 provides a perspective view of the handle assembly of FIG. 2, wherein a portion of the assembly has been removed for the sake of clarity.
Figure 4:
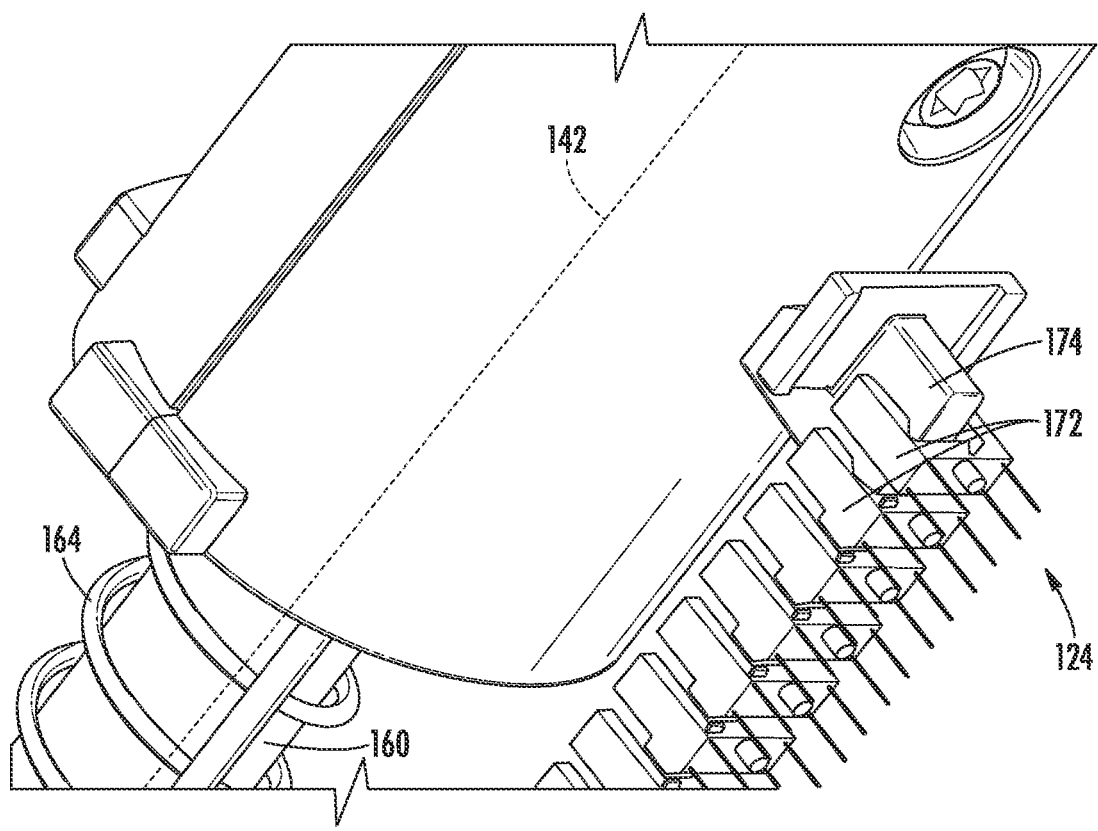
FIG. 4 provides a magnified bottom, perspective view of a portion of a handle assembly of a lawnmower according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Turning now to the figures, a power tool or lawnmower 100 is illustrated according to exemplary embodiments of the present disclosure. As shown in FIG. 1, lawnmower 100 includes a base chassis 110 defining a vertical direction V, a lateral direction L, and a transverse direction T. Base chassis 110 is supported by a plurality of wheels 112, 114 that are each rotatably attached to base chassis 110. In exemplary embodiments, lawnmower 100 includes a pair of front wheels 112 and a pair of rear wheels 114 transversely spaced apart from each other. In other words, each front wheel 112 is transversely spaced apart from a rear wheel 114. However, it is understood that any suitable wheel configuration may be provided in alternative embodiments. Moreover, although the exemplary embodiments describe a power tool as a user directed lawnmower, it is noted that the present disclosure may be equally applicable to another suitable power tool embodiment. For example, the present disclosure may be embodied on or within a zero turn radius (ZTR) mower, a riding lawnmower, a snow thrower, a soil tiller, a utility task vehicle (UTV), golf cart, wagon, etc.

With lawnmower 100, a cutting blade (not pictured) is rotatably mounted to base chassis 110 to cut or trim vegetation (e.g., grass) beneath base chassis 110. As would be understood, the cutting blade may include one or more radial blades (e.g., configured to rotate about vertical axis) or a sharpened reel (e.g., configured to rotate about a lateral axis). In some embodiments, a blade motor 116 is mechanically connected to (e.g., in mechanical communication with)

the cutting blade to motivate or rotate the cutting blade. For instance, a suitable electric motor or internal combustion motor may be mounted on base chassis 110 (e.g., within a head unit 118 attached to a top surface of base chassis 110) to rotate the cutting blade about its corresponding axis within an enclosed deck area 120 defined beneath base chassis 110. Optionally, one or more apertures or air impellers may be provided between the cutting blade and blade motor 116 such that, for example, an airflow is directed (e.g., vertically) across blade motor 116 in response to rotation of the cutting blade.

In optional embodiments, a removable mulch bag or receptacle 122 is selectively attached to base chassis 110 (e.g., at a rear portion of base chassis 110). In particular, mulch receptacle 122 may be connected to base chassis 110 downstream from a mulch outlet defined through base chassis 110 (e.g., along the transverse direction T). One or more suitable mechanical fasteners (e.g., hooks, latches, clips, etc.) may be provided on mulch receptacle 122 to engage a corresponding portion of base chassis 110 and thereby secure mulch receptacle 122 to a predetermined portion of base chassis 110. When attached, mulch receptacle 122 may surround the mulch outlet such that grass trimmings or debris may be pushed or blown by the cutting blade from the deck area 120, through the mulch outlet, and to mulch receptacle 122. As would be understood, mulch receptacle 122 may include a rigid skeleton frame to which a fabric (e.g., mesh) receptacle body is fixed. Optionally, a removable outlet plug 126 may be provided to selectively cover or fill the mulch outlet, such as during bagless mowing operations or when the collection of debris is otherwise undesirable. Such plugs may generally be formed from a suitable nonpermeable material that completely blocks or covers the mulch outlet and prevents the passage of debris therethrough. Additionally or alternatively, a removable mulch diverter chute (not pictured) may be provided to selectively attach to base chassis 110 (e.g., in lieu of mulch receptacle) to redirect debris from the deck area 120 to, for instance, a lateral side outlet of the diverter chute directed away from lawnmower 100, as is generally understood.

In certain embodiments, a propulsion motor 128 is provided in mechanical communication with one or more of the wheels (e.g., rear wheels 114) to selectively motivate or propel base chassis 110 (e.g., along the ground). For instance, a suitable electric motor or internal combustion motor may be mounted on base chassis 110 (e.g., forward or aft of the cutting blade) to rotate one or more of the wheels (i.e., a propulsion wheel) about its corresponding wheel axis (e.g., wheel axis 130) on base chassis 110. During use, propulsion motor 128 may be selectively activated to generate a rotational force or torque directed to one or more of the propulsion wheels (e.g., the pair of rear wheels 114), which in turn may cause to lawnmower 100 to move forward without additional or significant force from a user. Thus, exemplary embodiments of lawnmower 100 may be commonly described as a "self-propelled mower." Nonetheless, it is understood that various aspect of the present disclosure may be equally applicable to other mower configurations, such as a push mower.

In some embodiments, a controller 132 is provided in operative communication (e.g., electrical communication) with one or more portions of lawnmower 100 to direct features or operations thereof. Controller 132 may include a memory (e.g., non-transitive memory) and one or more microprocessors, CPUs or the like, such as general or special purpose microprocessors operable to execute programming instructions or micro-control code associated with operation of lawnmower 100. The memory may represent random access memory such as DRAM, or read only memory such as ROM or FLASH. In some embodiments, the processor executes programming instructions stored in memory. For certain embodiments, the instructions include a software package configured to operate lawnmower 100. The memory may be a separate component from the processor or may be included onboard within the processor. Alternatively, controller 132 may be constructed without using a microprocessor [e.g., using a combination of discrete analog or digital logic circuitry, such as switches, amplifiers, integrators, comparators, flip-flops, logic gates (e.g., AND, OR, XOR, NOT, NOR, NAND, etc.), and the like] to perform control functionality instead of relying upon software.

Controller 132, or portions thereof, may be provided in a variety of locations throughout lawnmower 100. In exemplary embodiments, controller 132 is located within head unit 118 (e.g., along with one or more suitable power sources or batteries 166 that provide an electrical current or voltage to controller 132). In other embodiments, controller 132 may be provided at any suitable location within lawnmower 100. Input/output ("I/O") signals may be routed between controller 132 and various operational components of lawnmower 100. For example, blade motor 116, propulsion motor 128, or one or more sensors (e.g., position sensors 134, attachment sensors 136, tilt sensors 137, etc.) may be in communication with controller 132 via one or more signal lines or shared communication busses.

One or more power sources or batteries 166 may be provided on lawnmower 100 to selectively supply power (e.g., in the form of a direct electrical current) to blade motor 116, propulsion motor 128, or other elements of lawnmower 100. For instance, two or more batteries 166 may be received within head unit 118. In some such embodiments, lawnmower 100 is configured to selectively operate in both a single-battery mode and a dual-battery mode. For instance, controller 132 may be configured to alternately implement a single-battery mode and a dual-battery mode based on whether one or two batteries 166 are detected. Optionally, the batteries 166 may be selectively received within the head unit 118 in an electrical series or parallel connection. Controller 132 may detect the presence of the batteries 166 based on a received voltage from the battery 166 (or any other suitable method). In the single-battery mode, only a single battery 166 (or a single battery 166 that includes a minimum threshold of stored electrical energy) is received within head unit 118 and provides power to at least a portion of lawnmower 100 (e.g., blade motor 116 or propulsion motor 128). In the dual-battery mode, two discrete batteries 166 having a minimum threshold of stored electrical energy are received within head unit 118 and mutually provide power to at least a portion of lawnmower 100 (e.g., blade motor 116 or propulsion motor 128). Thus, controller 132 may automatically detect the presence of one battery 166 or two batteries 166 and select the appropriate mode accordingly.

In additional or alternative embodiments, lawnmower 100 is configured to support on-board charging of the batteries 166 (e.g., within head unit 118). For example, an extension cord or plug may be provided on head unit 118 to connect to a suitable alternating current (AC) power source (e.g., municipal power grid, generator, etc.). When connected to the AC power source, a received AC current may be converted to a direct current (DC) that is supplied to, and stored within, the batteries 166. In some such embodiments, controller 132 includes a serial charging circuit configured to charge at least two batteries 166 sequentially when connected to the AC power source. For instance, controller 132 may initially charge a first battery 166 within head unit 118 and then charge a second battery 166 within head unit 118. In some such embodiments, charging of the second battery 166 may only be initiated subsequent to (e.g., in response to) a predetermined maximum charge being established within the first battery 166. In other embodiments, charging of the second battery 166 is initiated subsequent to one or more predetermined intermediate thresholds (i.e., threshold below the maximum charge) being established within the first battery 166. Additionally or alternatively, charging of first and second batteries 166 may be alternately initiated according to predetermined step sequence. Optionally, controller 132 may be further configured to block the normal discharge paths (e.g., from both batteries 166) when connected to AC power. Thus, while charging, operation of blade motor 116 or propulsion motor 128 may be prevented.

A handle frame 138 is mounted to base chassis 110 and generally extends along a longitudinal axis 142 therefrom. Specifically, handle frame 138 extends longitudinally from a mount end 144 to a grip end 146. At mount end 144, handle frame 138 is joined to base chassis 110 (e.g., directly or through an intermediate mounting assembly 140). Thus, the mount end 144 is proximal to base chassis 110. By contrast, the grip end 146 is longitudinally spaced apart from base chassis 110. In other words, in comparison to the mount end 144, the grip end 146 is distal to base chassis 110. It is noted that although handle frame 138 extends linearly along longitudinal axis 142 in exemplary embodiments, other embodiments may provide a curvilinear extension between handle frame 138 and the grip end 146 while still generally extending along a defined longitudinal axis 142.

In some embodiments, handle frame 138 includes a pair of lateral arms 148. For instance, each lateral arm 148 may extend from a separate lateral side of base chassis 110 (e.g., at mount end 144). As shown, each lateral arm 148 may be shaped as a twin or mirrored body generally extending longitudinally from mount end 144 toward the grip end 146 (e.g., in mutual parallel).

In certain embodiments, handlebar 150 is provided at the grip end 146 of handle frame 138. Handlebar 150 may provide a segment or defined region at which a user may grasp handle frame 138 during use of lawnmower 100. For instance, a handlebar 150 may extend laterally between a first end 152 and a second end 154. In some embodiments, handlebar 150 extends between and connects the pair of lateral arms 148. Thus, the first end 152 of handlebar 150 may be defined at one lateral arm 148 while the second end 154 of handlebar 150 is defined at the other lateral arm 148.

In optional embodiments, a tilt sensor 137 is mounted to lawnmower 100. For instance, tilt sensor 137 may be mounted to head unit 118. Additionally or alternatively, tilt sensor 137 may be fixed relative to base chassis 110. Generally, tilt sensor 137 is configured to transmit one or more status signals (e.g., detected angle signals) to controller 132 based on a detected angle of tilt sensor 137 (e.g., angle relative to a predetermined horizontal direction or plane). For instance, tilt sensor 137 may include an accelerometer, inclinometer, or any other suitable structure for detecting changes in inclination. In some such embodiments, controller 132 is configured to determine assumption of a storage position (e.g., base chassis 110 has been placed in or has reached the storage position). The storage position may be determined, for instance, in response to detecting an angle above 30° (e.g., equal to or greater than 45°, equal to or greater than 60°, or equal to or greater than 90°) relative to a horizontal direction (e.g., lateral direction L or transverse direction T). In response to determining the storage position, controller 132 may further be configured to restrict motor power. As an example, controller 132 may halt or prevent power from being transmitted to blade motor 116. As another example, controller 132 may halt or prevent power from being transmitted to propulsion motor 128. In optional embodiments, another discrete controller (e.g., in electrical or wireless communication with controller 132) may halt or prevent power from being transmitted to propulsion motor 128.

Turning especially to FIGS. 2 through 5, exemplary embodiments include a slider assembly 156 with handle frame 138. As shown, slider assembly 156 joins handle frame 138 together at a location between the mount end 144 and the grip end 146 (e.g., relative to the longitudinal axis 142). When assembled, slider assembly 156 generally permits the grip end 146 of handle frame 138 be moved relative to the mount end 144 of handle frame 138. Specifically, slider assembly 156 permits a longitudinal distance 170 between the grip end 146 (e.g., at handlebar 150) and the mount end 144 to be varied. In some such embodiments, slider assembly 156 is slidable between a rest position and an engaged position. In the engaged position, slider assembly 156 is longitudinally compressed, and thus provides a relatively reduced longitudinal distance 170 between the grip end 146 and the mount end 144 (e.g., in comparison to the rest position). By contrast, in the engaged position, slider assembly 156 is longitudinally extended and may provide a maximum longitudinal distance 170 that is, for example, greater than the longitudinal distance 170 in the engaged position.

A reception tube 158 of slider assembly 156 receives an insertion tube 160 (e.g., along the longitudinal axis 142). In some embodiments, insertion tube 160 is fixed to handlebar 150 and slides into and out of insertion tube 160 as slider assembly 156 moves between the rest position and the engaged position. Optionally, at least a portion of insertion tube 160 may be enclosed within reception tube 158. For instance, in the rest position, a smaller portion of insertion tube 160 is enclosed within reception tube 158 than is enclosed in the engaged position. In certain embodiments, an assembly shroud 162 further encloses at least a portion of insertion tube 160 and reception tube 158. As illustrated, one side of handlebar 150 may be inserted into assembly shroud 162 at one longitudinal end of reception tube 158. Similarly, a portion of reception tube 158 may be inserted into assembly shroud 162 at another longitudinal end of the assembly shroud 162. Thus, in some such embodiments, insertion tube 160, including the portion extending from handlebar 150, is covered or otherwise hidden from view (e.g., in both the rest position and the engaged position).

In exemplary embodiments, slider assembly 156 further includes a resilient spring 164 (e.g., compression spring, torsion spring, air spring or damper, or other suitable biasing element) biasing slider assembly 156 to the rest position. Specifically, resilient spring 164 may bias the grip end 146 away from the mount end 144. In certain embodiments, resilient spring 164 includes a compression spring coiled around insertion tube 160. As shown, resilient spring 164 may be sandwiched between handlebar 150 and insertion tube 160. For instance, one longitudinal end of resilient spring 164 may be seated on a flange fixed to handlebar 150 (or insertion tube 160), while the other longitudinal end of resilient spring 164 is seated on a flange fixed to reception tube 158. When assembled, resilient spring 164 may provide biasing force motivating slider assembly 156 toward an equilibrium at the rest position.

As shown, slider assembly 156 may be formed on, or as part of, each lateral arm 148. Thus, each lateral arm 148 may include a corresponding insertion tube 160, reception tube 158, resilient spring 164, assembly shroud 162, etc. In some such embodiments, a spanner bar 168 extends between each lateral arm 148 (e.g., along the lateral direction L perpendicular to the longitudinal axis 142) and may connect the same. For instance, spanner bar 168 may be fixed to both assembly shrouds 162. In other words, one lateral end of spanner bar 168 may be fixed to one assembly shroud 162, while the other lateral end of spanner bar 168 is fixed to the other assembly shroud 162. Advantageously, spanner bar 168 may prevent misalignment from occurring between the two lateral sides of slider assembly 156 (e.g., as handlebar 150 moves between the rest position and the engaged position).

In some embodiments, controller 132 is in operable communication (e.g., electrical communication) with slider assembly 156. For instance, slider assembly 156 may include a position sensor 134 to detect the movement or position of handlebar 150 (e.g., relative to the rest position). In other words, position sensor 134 may detect the longitudinal distance 170 between the grip end 146 and the mount end 144.

Position sensor 134 may include any suitable sensing structure or configuration to detect relative movement or positioning of handlebar 150 from the rest position (i.e., in relation to the rest position). In certain embodiments, position sensor 134 includes an optical sensor having a plurality of gates 172 spaced apart from each other along longitudinal axis 142. Together, the plurality of gates 172 form a detection path that is, for example, parallel longitudinal axis 142. A unique light beam is transmitted between opposite lateral ends of each gate 172 (e.g., by a light emitting diode at one lateral end of the gate 172) and across the detection path. An interrupter tag 174 that is fixed, for example, insertion tube 160 or handlebar 150 extends into the detection path and selectively interrupts or breaks the beam transmitted by one or more of the gates 172. Optionally, position sensor 134, including the gates 172 and interrupter tag 174, may be enclosed within at least one assembly shroud 162.

During use, the specific gate or gates 172 that the interrupter tag 174 interrupts may be contingent upon where handlebar 150 is longitudinally positioned in relation to the rest position (i.e., the longitudinal distance 170). Thus, position sensor 134 may be configured to detect the longitudinal distance 170 between the grip end 146 in the mount end 144 relative to the rest position. Moreover, one or more position signals corresponding to the detected longitudinal distance 170 may be transmitted from position sensor 134 and received by controller 132. Advantageously, the described optical sensor may have a notably robust construction unlikely to suffer from wear or a reduced life attributable to extended use, as might occur for a potentiometer.

It is noted that although position sensor 134 may include an optical sensor, as shown in the illustrated figures, other embodiments include a potentiometer, a Hall effect sensor, pressure sensor, one or more Reed switches, etc. to detect multiple unique positions of slider assembly 156 from the rest position. Moreover, although multiple slider assemblies 156 are illustrated, some such embodiments may include position sensor 134 with only one of the slider assemblies 156 (e.g., within only one assembly shroud 162). Alternatively, a separate or unique position sensor 134 may be included with each of the slider assemblies 156.

Controller 132 may be configured to direct or vary operation of lawnmower 100 based on the longitudinal distance 170 detected at position sensor 134. In certain embodiments, controller 132 directs propulsion motor 128 according to the position signal received from position sensor 134. For instance, controller 132 may be configured to set a motivation speed (e.g., as a percentage of maximum power output, as a rotational velocity at which a propulsion wheel is intended to rotate, as a linear velocity at which lawnmower 100 is intended to travel along the ground, as a force or torque to be supplied to a propulsion wheel, etc.) at propulsion motor 128 based on the received position signal. Thus, motivation speed may be based on the longitudinal distance 170 between the grip end 146 and the mount end 144.

Optionally, motivation speed may be increased (e.g., to a predetermined limit) as the longitudinal distance 170 between the grip end 146 and the mount end 144 is decreased. In other words, compressing slider assembly 156 and moving handlebar 150 longitudinally inward toward the mount end 144 may cause the motivation speed at propulsion motor 128 to increase. By contrast, expanding slider assembly 156 and moving handlebar 150 longitudinally outward away from the mount end 144 may cause the motivation speed at propulsion motor 128 to decrease. Alternatively, and as would be recognized, motivation speed may be decreased or otherwise varied (e.g., to a predetermined limit) as the longitudinal distance 170 between the grip end 146 and the mount end 144 is decreased.

In some embodiments, the rest position of slider assembly 156 corresponds to a motivation speed of zero. Thus, at the rest position, propulsion motor 128 may be inactive or otherwise provide no additional energy to rotate propulsion wheels (e.g., rear wheels 114) or propel lawnmower 100.

In certain embodiments, a plurality of discrete power outputs (e.g., predefined percentages of maximum power output) for propulsion motor 128 are correlated to the longitudinal distance 170. For example, several gates 172 of position sensor 134 may define a discrete corresponding power output. In some such embodiments, the corresponding power output generally increases as the longitudinal distance 170 decreases. An example of such a relationship is illustrated in Table 1 below. In the below table, the gate position "0" corresponds to the rest position. Also, the values for gate position are inversely related to the longitudinal distance 170. In other words, a higher gate position value corresponds to a closer position to the mount end 144 and a reduced longitudinal distance 170. Interruption of a gate 172 (e.g., one or more gates 172) having a higher gate position value indicates that handlebar 170 has been moved closer to mount end 144 within slider assembly 156.

TABLE 1

| | Gate Position | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Power Output (%) | 0 | 0 | 0 | 0 | 10 | 18 | 26 | 34 | 42 | 50 | 58 | 66 | 74 | 82 | 90 | 98 |

In optional embodiments, a predefined throttle ramp rate is provided to control changes in power output as the detected position (e.g., position of interrupter tag 174 along the gate positions). For example, controller 132 may be configured to adjust power output at propulsion motor 128 according to the predefined throttle ramp (e.g., as change in power output over time). Alternatively, an encoder on position sensor 134 may be configured to apply the predetermined throttle ramp directly to the output position signal.

Generally, the predefined throttle ramp sets the rate over time (e.g., as %/seconds) for how rapidly the propulsion motor 128 will increase from one power output to the next. Thus, changes in power output may be gradual, and not immediate as the detected gate position changes from one gate position to the next. Optionally, a single throttle ramp rate is provided for the entire power output range. Changes in power output may be thus made at a constant, predictable rate.

In some embodiments, a programmed hysteresis is provided between certain gate positions (e.g., for gates 172). The hysteresis may be unidirectional, such that the hysteresis is only implemented in one direction (e.g., forward along the longitudinal axis 142 toward the mount end 144). Additionally, the hysteresis may be applied only after slider assembly 158 has reached a predetermined hysteresis gate position. In other words, hysteresis may only be applied after interrupter tag 174 has reached the predetermined hysteresis gate position. The power output may be different for one or more of the previous gate positions after the predetermined hysteresis gate position has been reached. An example of such a relationship is illustrated below in Table 2. Table 2 is understood to provide a hysteresis power output chart to be applied (e.g., as a replacement for Table 1) only after gate position 4 has been reached (i.e., gate position 4 is the predetermined hysteresis gate position). Thus, controller 132 may be configured to alter the power output for a corresponding gate after the predetermined hysteresis gate position has been reached. In some such embodiments, controller 132 is further configured to reapply the original power output (e.g., as represented in Table 1) upon returning slider assembly 156 to the rest position. Advantageously, the one-way programmed hysteresis may prevent sudden, jerking movements of lawnmower 100 (e.g., at relatively low speeds or power output settings).

176 may be located along the longitudinal path of slider assembly 156, thereby blocking the forward or downward longitudinal movement of handlebar 150 toward the engaged position. In some such embodiments, the locked position maintains handlebar 150 in the rest position. In turn propulsion motor 128 may remain inactive, and lawnmower 100 may be utilized in a manual or push-only configuration.

In additional or alternative embodiments, a unique reverse input may be provided (e.g., as a discrete button, slider, switch, etc. on a control panel 191). Generally, the reverse input may be configured to transmit a reverse signal to controller 132 (e.g., in response to user engagement of the reverse input). Controller 132 may be configured to initiate a reverse rotation at propulsion motor 128, which may then be transmitted to the rear wheels 114, based on the received reverse signal. In other words, controller 132 may direct the rear wheels 114 to rotate in reverse (e.g., rearward or counter to the forward direction of rotation initiated by movement of slider assembly 156) in response to receiving the reverse signal. In some such embodiments, reverse rotation may be dependent on the reverse input being engaged. Specifically, the reverse signal may be continuously transmitted while the reverse input is engaged and cease once the reverse input is no longer engaged. Thus, controller 132 may halt reverse rotation in response to the user input being released (i.e., no longer engaged). Optionally, reverse rotation may also be dependent on the position of the slider assembly 156. For instance, controller 132 may be configured to initiate reverse rotation only if slider assembly 156 is in the rest position (e.g., as detected at position sensor 134). In other words, even after receiving the reverse signal, controller 132 may be configured to require confirmation that slider assembly 156 is in the rest position before initiating reverse rotation at propulsion motor 128 or rear wheels 114.

In further additional or alternative embodiments, the reverse input may be initiated in response to movement of slider assembly 156 to a further rearward position. For instance, a negative rear position or gate 172 may be

TABLE 2

| | Gate Position | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Power Output (%) | 0 | 0 | 10 | 10 | 10 | 18 | 26 | 34 | 42 | 50 | 58 | 66 | 74 | 82 | 90 | 98 |

Figure 5:
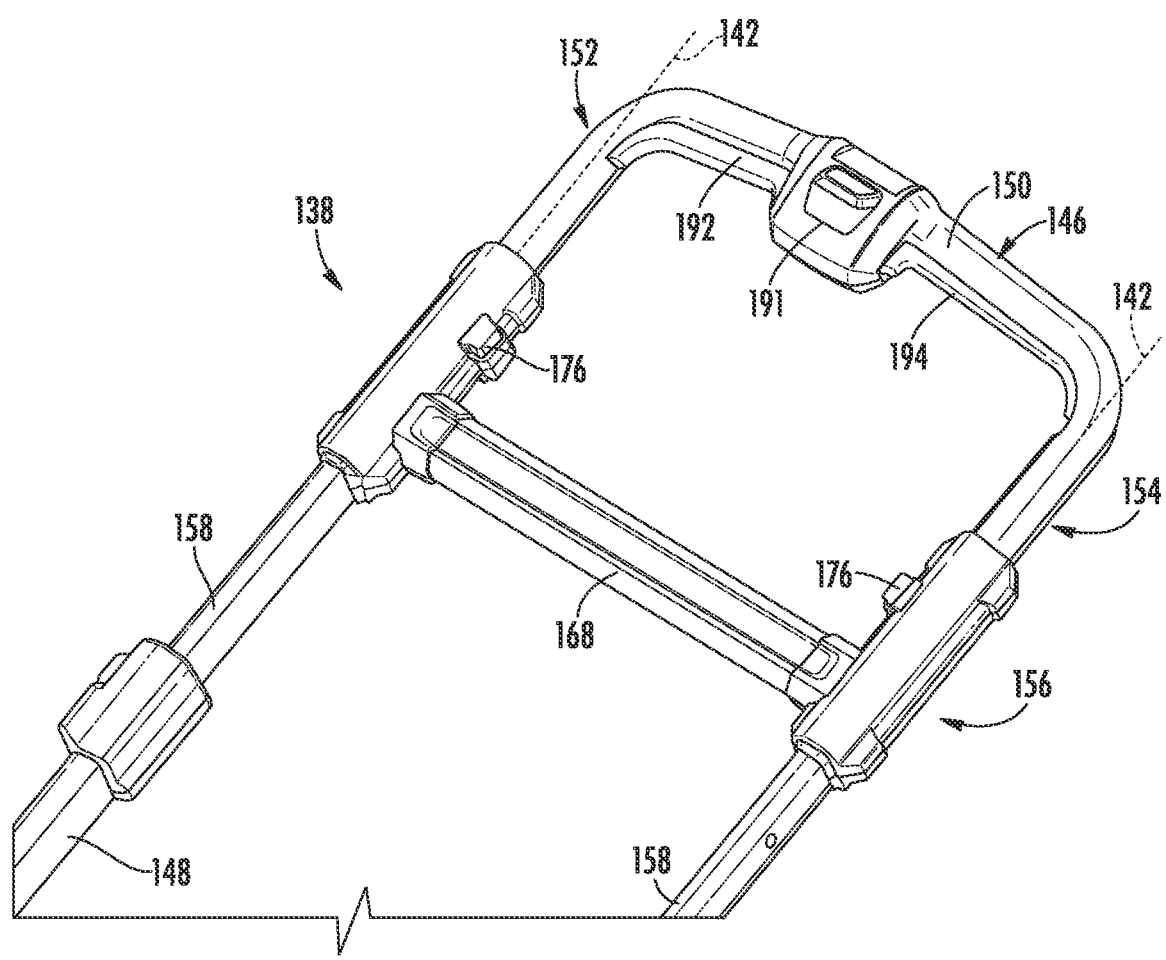
FIG. 5 provides a perspective view of a portion of a handle assembly of a lawnmower according to exemplary embodiments of the present disclosure.

In optional embodiments, a slide lock 176 is included with slider assembly 156. Specifically, slide lock 176 selectively locks slider assembly 156 in a predetermined position or otherwise blocks longitudinal movement of slider assembly 156. Slide lock 176 may include a movable button or tab be moved into the longitudinal path of at least a portion of slider assembly 156 (e.g., a portion of handlebar 150 or insertion tube 160). As illustrated in FIG. 5, slide lock 176 may include a button that is slidable perpendicular to longitudinal axis 142 between a locked position and an unlocked position. In the unlocked position, the slide lock 176 may generally block longitudinal movement of handlebar 150 or grip end 146. For instance, the slide lock 176 may be lifted above the longitudinal path of slider assembly 156, thereby allowing unimpeded movement of handlebar 150 and insertion tube 160. By contrast, in the locked position, slide lock 176 may generally permit longitudinal movement of handlebar 150 or grip end 146. For instance, slide lock provided to detect that slider assembly 156 or handlebar 170 is in a rearward position from the rest position (i.e., that handlebar 170 has been moved further from mount end 144 within slider assembly 156).

Figure 25:
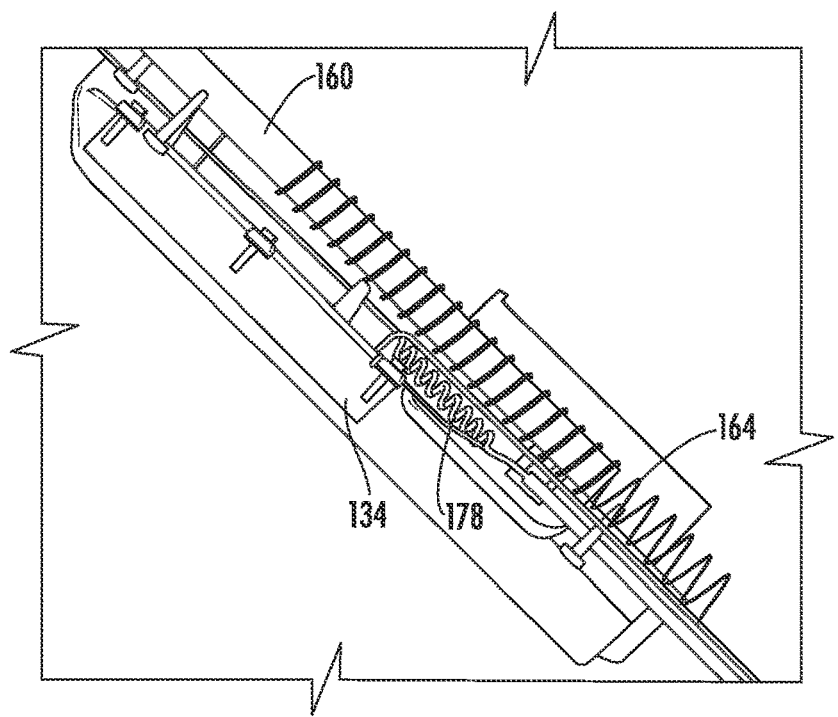
FIG. 25 provides a perspective view of a portion of a handle assembly of a lawnmower according to exemplary embodiments of the present disclosure.

In certain embodiments, such as those illustrated in FIG. 25, a coiled wire segment 178 is provided within slider assembly 156. For instance, a wired path may generally be formed within handle frame 138 (e.g., as one or more electrically-connected wires or busses enclosed within each lateral arm 148). Much of the electrical path may be formed by straight, non-coiled wire segments 178. However, at least a portion of the electrical path (e.g., within reception tube 158) may include a resilient coiled wire segment 178 configured to expand/contract along the longitudinal axis 142.

Figure 7:
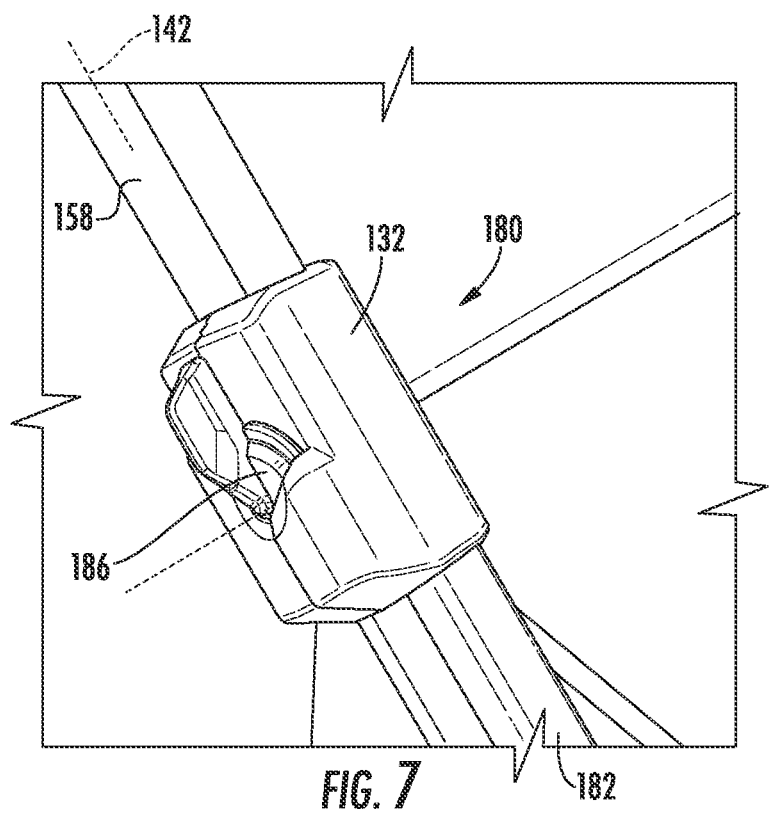
FIG. 7 provides a magnified perspective view of a telescoping assembly of the handle assembly on a lawnmower appliance according to exemplary embodiments of the present disclosure.
Figure 8:
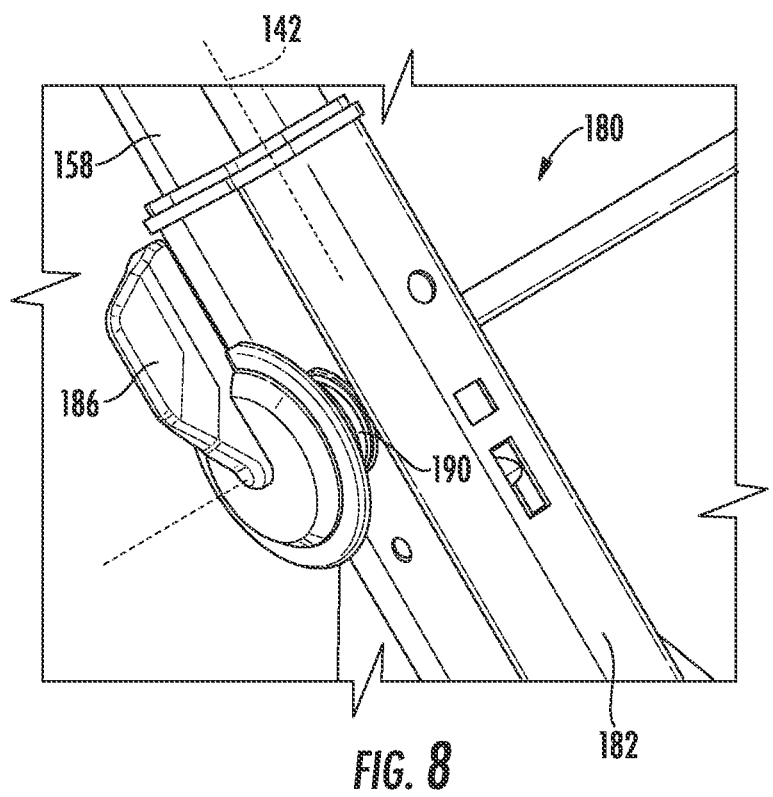
FIG. 8 provides a perspective view of the telescoping assembly of FIG. 7, wherein a portion of the assembly has been removed for the sake of clarity.

As shown, especially in FIGS. 1 and 7-8, handle frame 138 may include a telescoping assembly 180 (e.g., separate or independent from slider assembly 156). In some embodiments, telescoping assembly 180 includes a telescoping tube 182 into which another portion of handle frame 138 can slide. For instance, each lateral arm 148 may include a corresponding telescoping tube 182 that receives another portion of lateral arm 148 to selectively vary an overall longitudinal length 184 between the grip end 146 and the mount end 144 of handle frame 138. In embodiments that include a slider assembly 156, changes in the overall longitudinal length 184 also change the rest position. Thus, overall longitudinal length 184 may be defined in the rest position. Moreover, changes or alterations in the overall longitudinal length 184 may reduce the height of the mount end 144 of handlebar 150 without affecting the position sensed at position sensor 134.

Optionally, a telescope lock 186 may be provided with telescoping assembly 180. When assembled, telescope lock 186 may selectively secure or lock handle frame 138 in a particular or selected overall longitudinal length 184. In some such embodiments, a telescope shroud 188 is mounted to telescoping tube 182 to secure telescope lock 186 thereon. Telescope shroud 188 may permit rotation of telescope lock 186 on telescope shroud 188 (e.g., about an axis perpendicular to the longitudinal axis 142). An internal prong 190 may extend from telescope lock 186 inward, toward telescoping tube 182. Rotation of telescope lock 186 may vary the extension of internal prong 190 and, thereby, bring the internal prong 190 closer to or further from longitudinal axis 142 (e.g., according to the direction of rotation). An aperture or opening may be defined through an outer wall of telescoping tube 182 to receive internal prong 190. In turn, internal prong 190 of telescope lock 186 may be permitted to selectively engage, for instance, reception tube 158 within telescoping tube 182 (e.g., to restrict further longitudinal movement of reception tube 158 relative to telescoping tube 182). As an example, one or more grooves or openings may be defined through reception tube 158 (e.g., perpendicular to the longitudinal axis 142) to receive internal prong 190, and thereby define a predetermined setting for the overall distance between the grip end 146 and the mount end 144 of handle frame 138.

Figure 26:
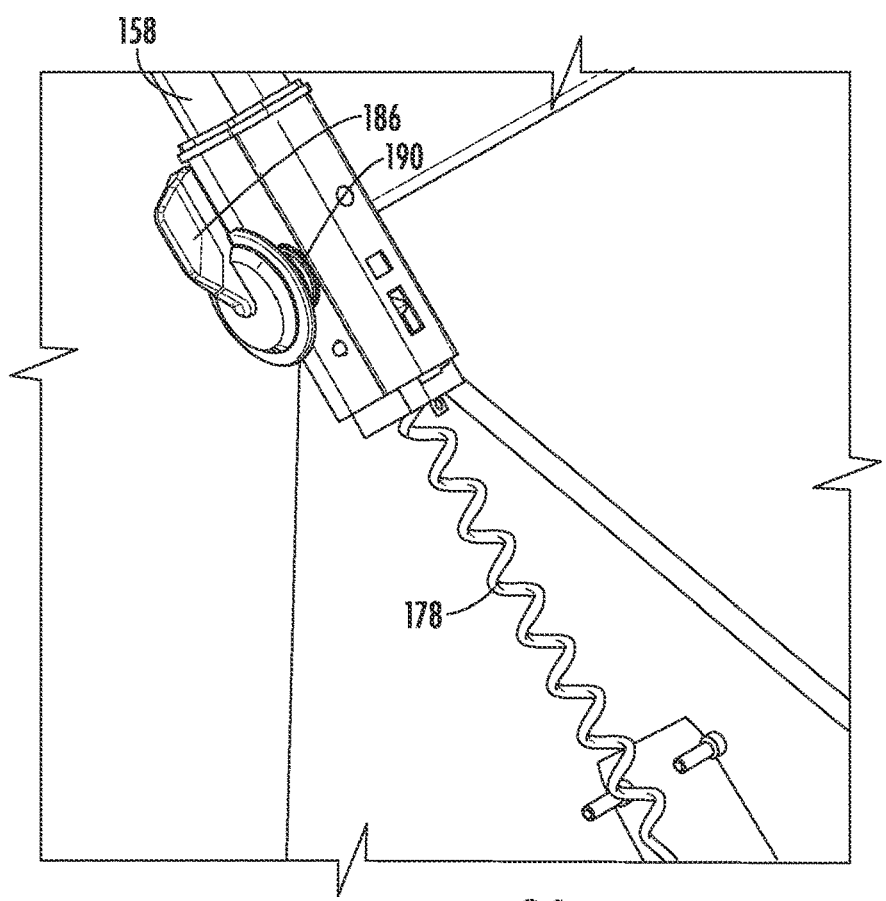
FIG. 26 provides a perspective view of another portion of a handle assembly of a lawnmower according to exemplary embodiments of the present disclosure.

In certain embodiments, such as those illustrated in FIG. 26, a coiled wire segment 178 is provided within telescoping assembly 180. For instance, a wired path may generally be formed within handle frame 138 (e.g., as one or more electrically-connected wires or busses enclosed within each lateral arm 148). Much of the electrical path may be formed by straight, non-coiled wire segments. However, at least a portion of the electrical path (e.g., within telescoping tube 182—FIG. 8) may include a resilient coiled wire segment 178 configured to expand/contract along the longitudinal axis 142.

Figure 6:
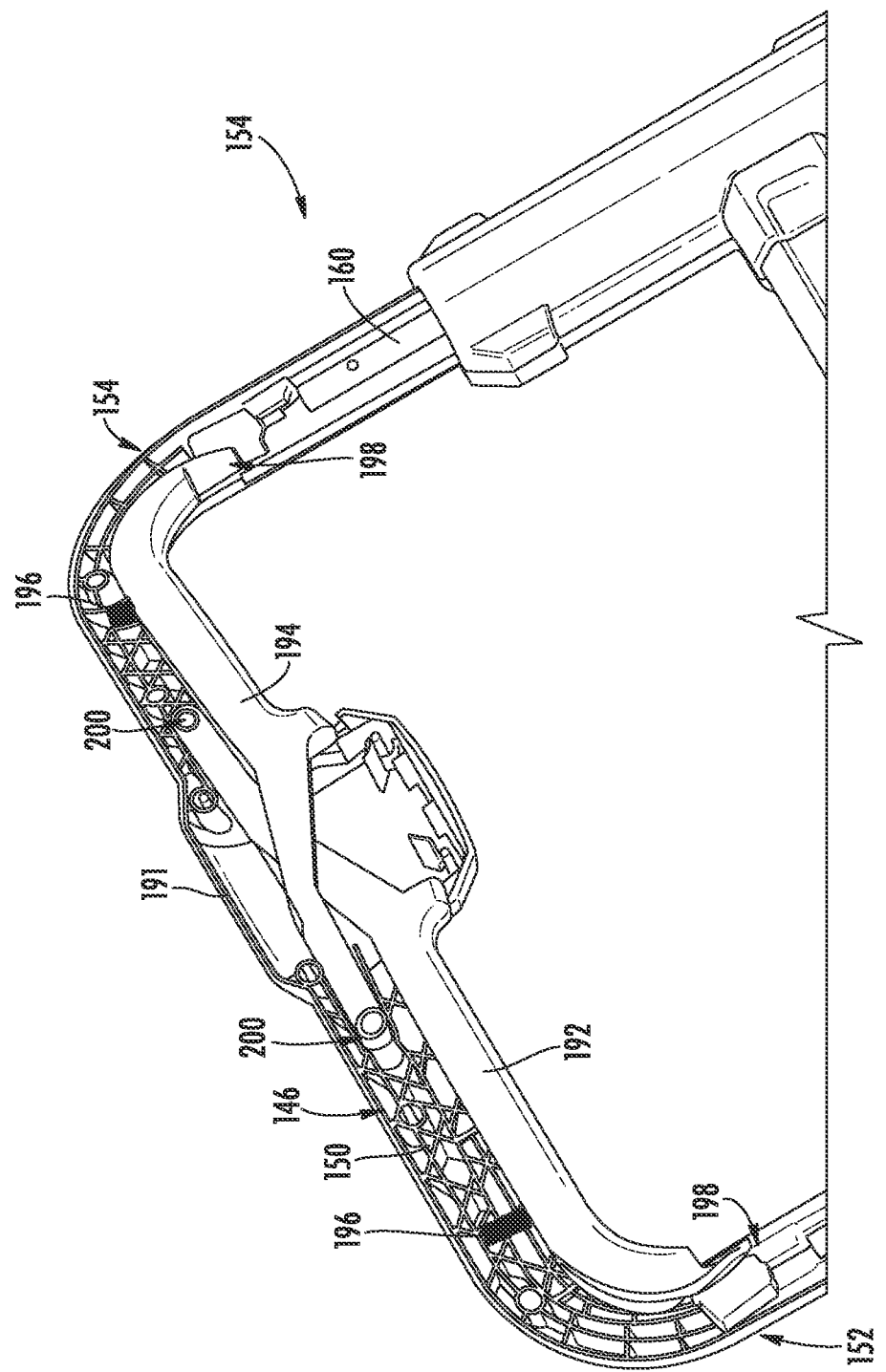
FIG. 6 provides a perspective view of the handle assembly of FIG. 2, including multiple paddles, wherein a portion of the assembly has been removed for the sake of clarity.

Turning especially to FIG. 6, certain embodiments include one or more grip-engaged paddles 192, 194 mounted on handlebar 150. For instance, a pair of grip-engaged paddles 192, 194 may be mounted on opposite lateral sides of handlebar 150. As shown, the grip-engaged paddles 192, 194 are movably mounted at the grip end 146 and can be selectively engaged, for instance, by a user's hand while grasping or otherwise contacting handlebar 150. For instance, a grip-engaged paddle 192 or 194 may extend laterally across, at least a portion of handlebar 150. During use, squeezing or pulling the grip-engaged paddle 192 or 194 toward handlebar 150 may force the grip-engaged paddle 192 or 194 to an operative position (e.g., as illustrated at a first paddle 194), while releasing the grip-engaged paddle 192 or 194 may permit the grip-engaged paddle 192 or 194 to extend forward from handlebar 150 to an inoperative position (e.g., as illustrated at a second paddle 192). In some such embodiments, a paddle spring 196 biases the grip-engaged paddle 192 or 194 to the inoperative position.

In certain embodiments, the grip-engaged paddle 192 or 194 extends (e.g., laterally) between a free end 198 and a pivot end 200. Pivot end 200 provides a mounting point at which the grip-engaged paddle 192 or 194 is fixed to handlebar 150, along with a pivot axis about which free end 198 pivots. In some such embodiments, the grip-engaged paddle 192 or 194 spans across a center line (e.g., lateral center point between the first end 152 and the second end 154) of handlebar 150. Specifically, the free end 198 may be located on one side of the center line, while the pivot end 200 is located on the opposite side of the center line. In some such embodiments, the pivot end 200 is located closer to the first end 152 of handlebar 150 than it is the second end 154 of handlebar 150, while the free end 198 is located closer to the second end 154 of handlebar 150 than it is the first end 152 of handlebar 150. If a pair of grip-engaged paddle 192 and 194 is provided, the second paddle 192 may have a pivot end 200 located closer to the second end 154 of handlebar 150 than it is the first end 152 of handlebar 150, while the free end 198 of the second paddle 192 is located closer to the first end 152 of handlebar 150 than it is the second end 154 of handlebar 150.

Advantageously, the grip-engaged paddle 192 or 194 may simulate linear movement (i.e., non-pivoting movement) while providing a relatively simple mounting configuration.

Optionally, an interface panel 191 may be located on handlebar 150 (e.g., at or across the center line between the first end 152 and the second end 154). Interface panel 191 may include one or more inputs (e.g., tactile buttons, knobs, toggles, or capacitive touch panels) in operative communication with controller 132. In some embodiments, both the first paddle 194 and the second paddle 192 extend through interface panel 191 (e.g., laterally in a cross pattern, as illustrated in FIG. 6).

In exemplary embodiments, grip-engaged paddles 192, 194 effectuate a safety condition. As an example, activation of blade motor 116 or rotation of the cutting blade may be conditioned upon one or both of the grip-engaged paddles 192, 194 being actuated (e.g., grasped) or otherwise moved to the operative position. In some such embodiments, controller 132 is configured to receive a user-initiated start signal (e.g., from an input on interface panel 191) and a paddle signal (e.g., from one or more of the grip-engaged paddles 192, 194, or a switch mechanically coupled thereto) before transmitting an activation signal to blade motor 116 and initiating the rotation of the cutting blade. Controller 132 may be further configured to require continuous reception of the paddle signal while blade motor 116 remains active. Loss of the paddle signal may cause controller 132 to halt activation of blade motor 116 (i.e., deactivate blade motor 116) or rotation of the cutting blade. Thus, releasing one or both of the grip-engaged paddles 192, 194 (e.g., such that both paddles 192 and 194 are in the inoperative position) may result in deactivation of the cutting blade.

Optionally, the paddle signal may be provided in the form of an open signal path. For instance, transmission of the paddle signal may be embodied as closing an electrical path (e.g., to/from controller 132). In turn, loss of the paddle signal may be embodied as opening the electrical path. Thus, deactivation of blade motor 116 may be virtually instantaneous upon release of one or both of the grip-engaged paddles 192, 194.

Figure 24:
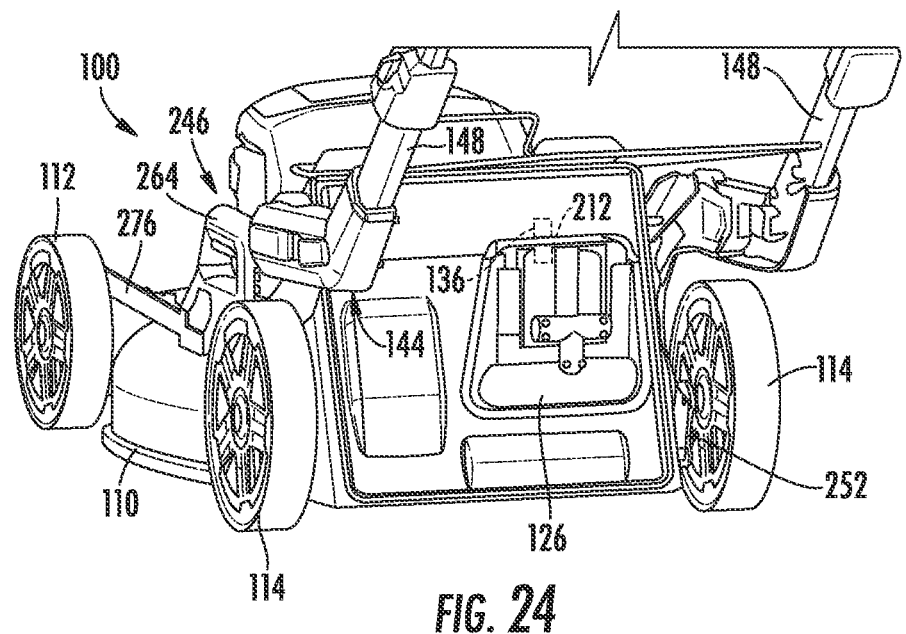
FIG. 24 provides a rear perspective view of a portion of a lawnmower according to exemplary embodiments of the present disclosure, wherein a mulch receptacle has been removed.

In additional or alternative embodiments, activation of blade motor 116 is contingent upon receiving a mulch receptor signal. As an example, an attachment sensor 136 may be mounted on base chassis 110 (e.g., at a rear portion thereof or proximal to the mulch opening) is electrical communication with controller 132. Attachment sensor 136 may be mounted on or configured to operably couple with a portion of a mulch cover, such as a mulch receptacle 122, a mulch plug 126 (FIG. 24), or mulch diverter chute (not pictured) selectively positioned over the mulch opening. For instance, an attachment tag (e.g., magnetic element) 212 may be fixed to mulch receptacle 122, mulch plug 126, or the diverter chute to selectively engage with a corresponding magnetic sensor provided with or as part of attachment sensor 136. Magnetic engagement between the magnetic element of attachment tag 212 and the magnetic sensor of attachment sensor 136 may result in transmission of the mulch receptor signal. Controller 132 may be configured to only initiate activation of blade motor 116 if the mulch receptor signal is received (e.g., prior receiving the user initiated start signal). For instance, controller 132 may initiate a no-cutting mode if no mulch receptor signal is received. In the no-cutting mode, controller 132 may halt activation of blade motor 116 until the mulch receptor signal is received, at which point a cutting mode is initiated. Activation of blade motor 116 may be permitted in the cutting mode. Optionally, propulsion motor 128 may continue to operate in the no cutting mode. Advantageously, lawnmower 100 may be free of any flap or door that selectively closes or covers the mulch opening.

It is noted that although attachment sensor 136 may include a magnetic sensor and corresponding magnetic element (e.g., at attachment tag 212), other embodiments include a potentiometer, a Hall effect sensor, pressure sensor, one or more Reed switches, etc. to detect that mulch receptacle 122, mulch plug 126, or the diverter chute has been suitably attached to base chassis 110. In optional embodiments, another discrete controller (e.g., in electrical or wireless communication with controller 132) may be provided in communication with attachment sensor to receive/transmit one or more signals therefrom.

Turning now to FIGS. 1 and 9 through 13, some embodiments include a use-angle assembly 214 at which the mount end 144 of handle frame 138 joins base chassis 110. When assembled, use-angle assembly 214 generally permits a user to selectively set or change an angle of handle frame 138 relative to base chassis 110 or the ground (i.e., surface on which lawnmower 100 rests). Specifically, use-angle assembly 214 defines a handle rotation axis 216 that is parallel, for example, to the wheel axis 130 and about which at least a portion of handle frame 138 may be rotated. Such rotation may, alter an angle between the longitudinal axis 142 and the ground. Moreover, a height or vertical location of the grip end 146 relative to the base chassis 110 or ground may be altered.

As shown, use-angle assembly 214 includes a support bracket 218, an intermediate cup 222, and a handle bracket 220. Support bracket 218 may be fixed to base chassis 110, such as at a rear portion of base chassis 110. Handle bracket 220 may be fixed to handle frame 138. Specifically, handle bracket 220 is fixed to the mount end 144 of handle frame 138. Intermediate cup 222 facilitates an interface between a support bracket 218 and handle bracket 220. For instance, intermediate cup 222 may be located, at least in part, laterally between support bracket 218 and handle bracket 220.

Generally, intermediate cup 222 is attached to support bracket 218. One or more mechanical fasteners (e.g., hooks, pins, bolts, latches, etc.) may secure intermediate cup 222 in a predetermined attachment position relative to support bracket 218. Handle bracket 220 selectively engages intermediate cup 222 and is thus permitted to pivot or rotate relative to intermediate cup 222 and support bracket 218. A pair of interface ridges 224, 226 between handle bracket 220 and intermediate cup 222 may define a plurality of predetermined pivot positions for handle bracket 220. For instance, a plurality of cup ridges 224 defined on intermediate cup 222 may extend laterally toward handle bracket 220, while a plurality of bracket ridges 226 defined on handle bracket 220 extends laterally toward intermediate cup 222. Both the cup ridges 224 and the bracket ridges 226 may be formed on mated arcuate paths defined about the handle rotation axis 216. During use of lawnmower 100, the pair of interface ridges 224, 226 may be enmeshed such that relative rotation is prevented. However, during angle adjustments, the pair of interface ridges 224, 226 may be laterally separated such that the bracket ridges 226 are permitted to rotate about the handle rotation axis 216 and relative to the cup ridges 224.

Figure 9:
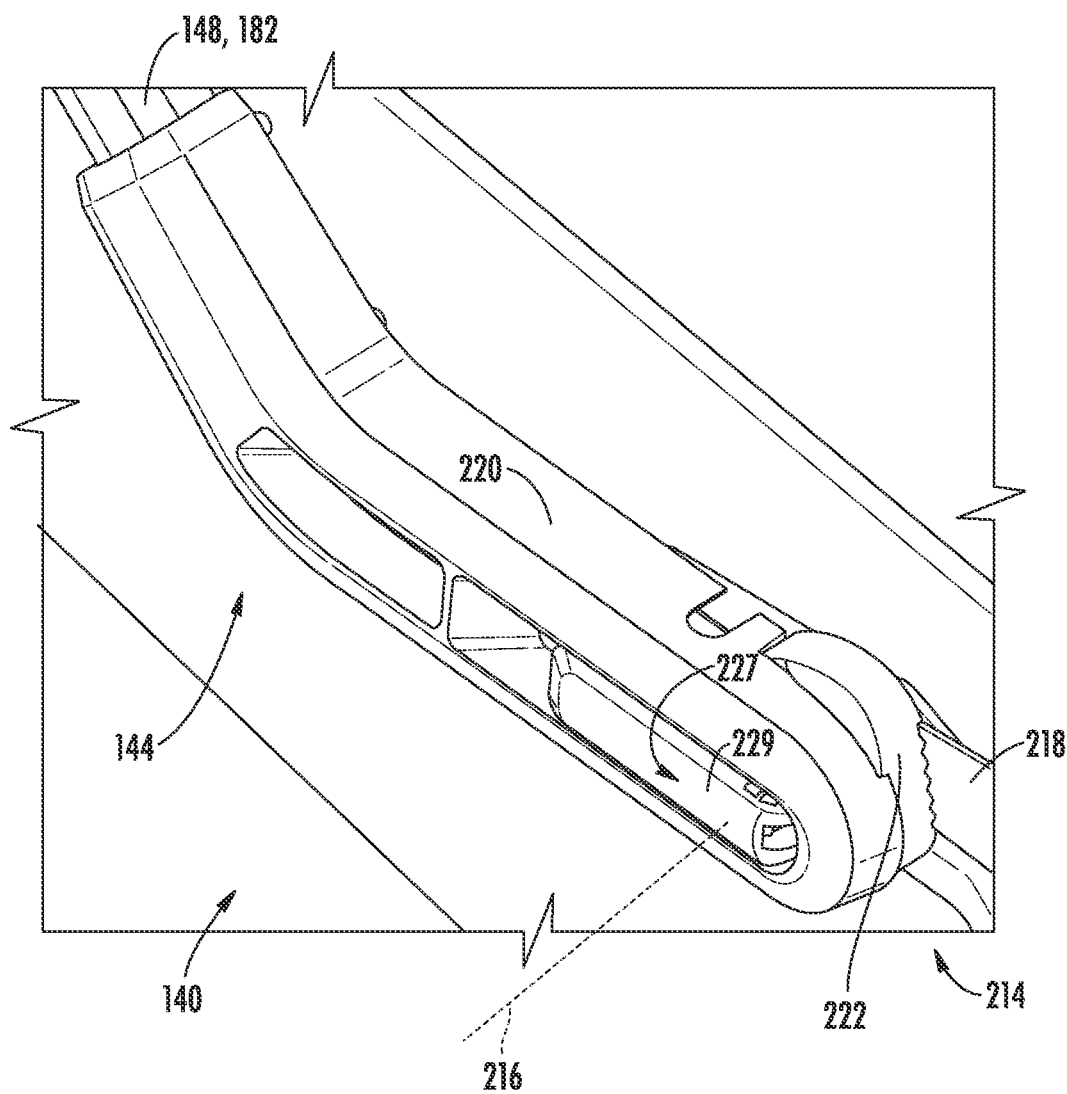
FIG. 9 provides a perspective view of a use-angle assembly of the handle assembly on a lawnmower appliance according to exemplary embodiments of the present disclosure.
Figure 10:
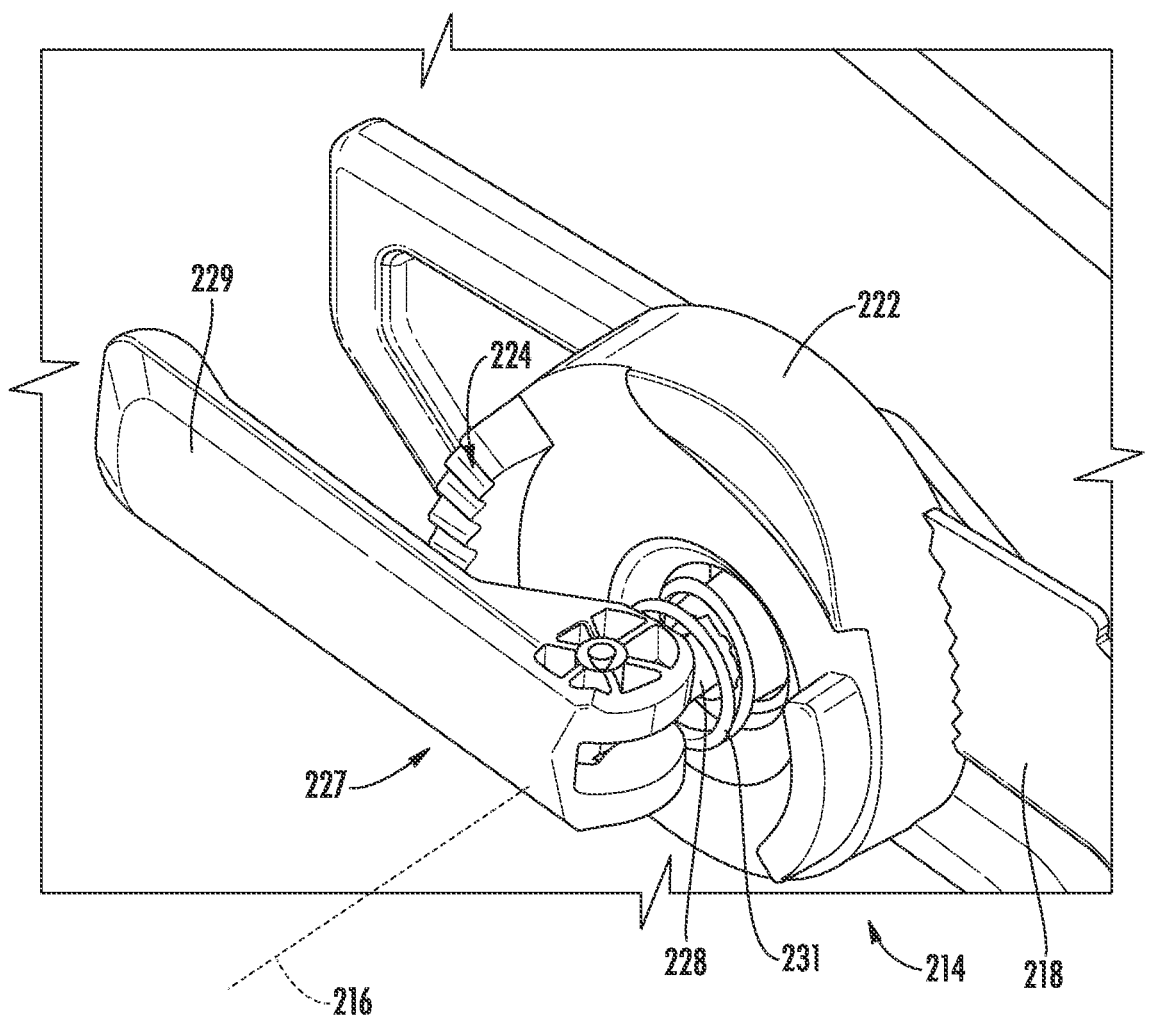
FIG. 10 provides a perspective view of the use-angle assembly of FIG. 9, wherein a portion of the assembly has been removed for the sake of clarity.
Figure 11:
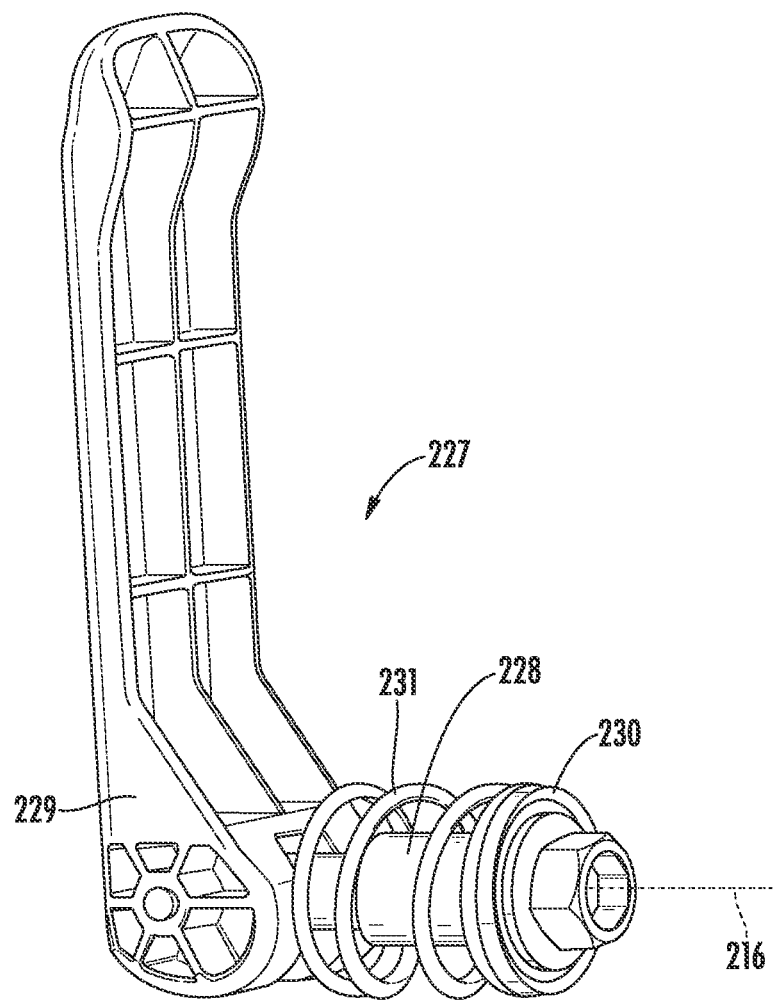
FIG. 11 provides a perspective view of a portion of the use-angle assembly, including a latch, of FIG. 9.
Figure 12:
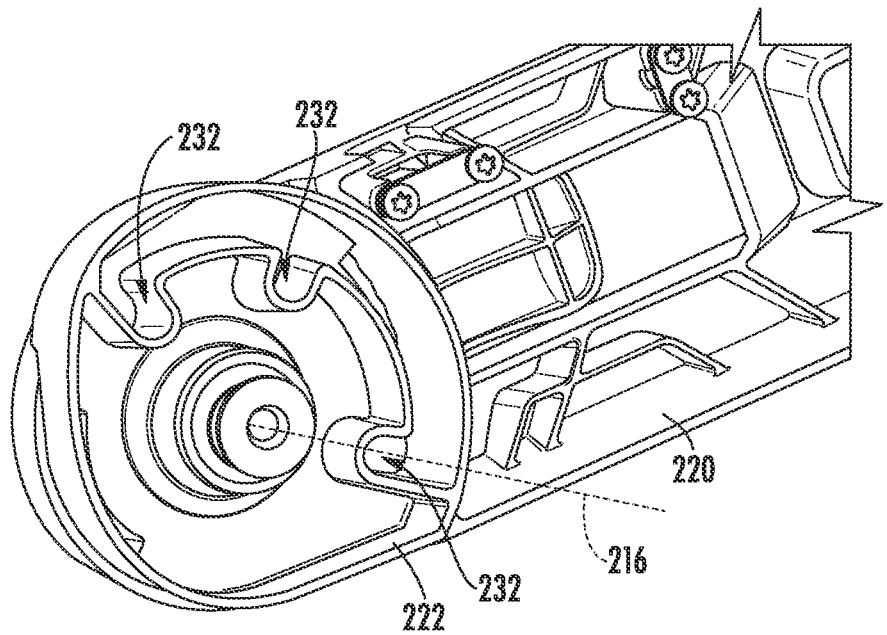
FIG. 12 provides an interior perspective view of a portion of the use-angle assembly of FIG. 9.
Figure 13:
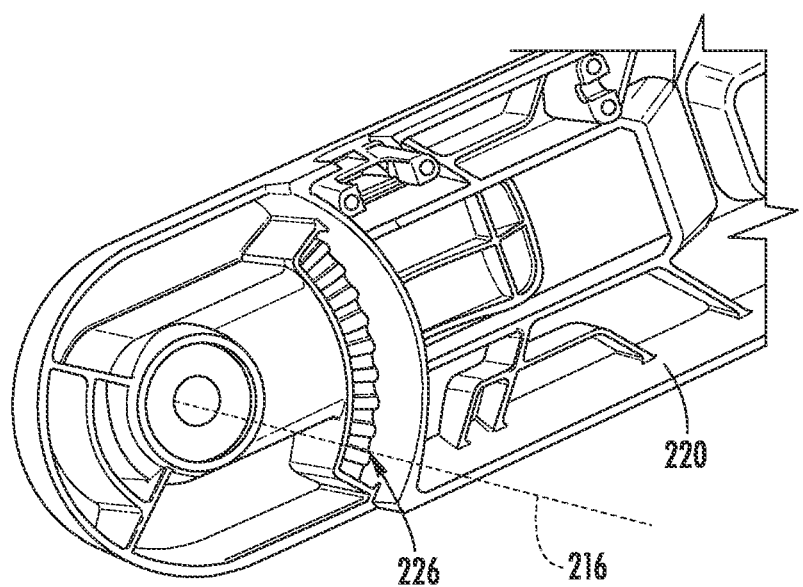
FIG. 13 provides an interior perspective view of a portion of the use-angle assembly, including a handle bracket, of FIG. 9.
Figure 14:
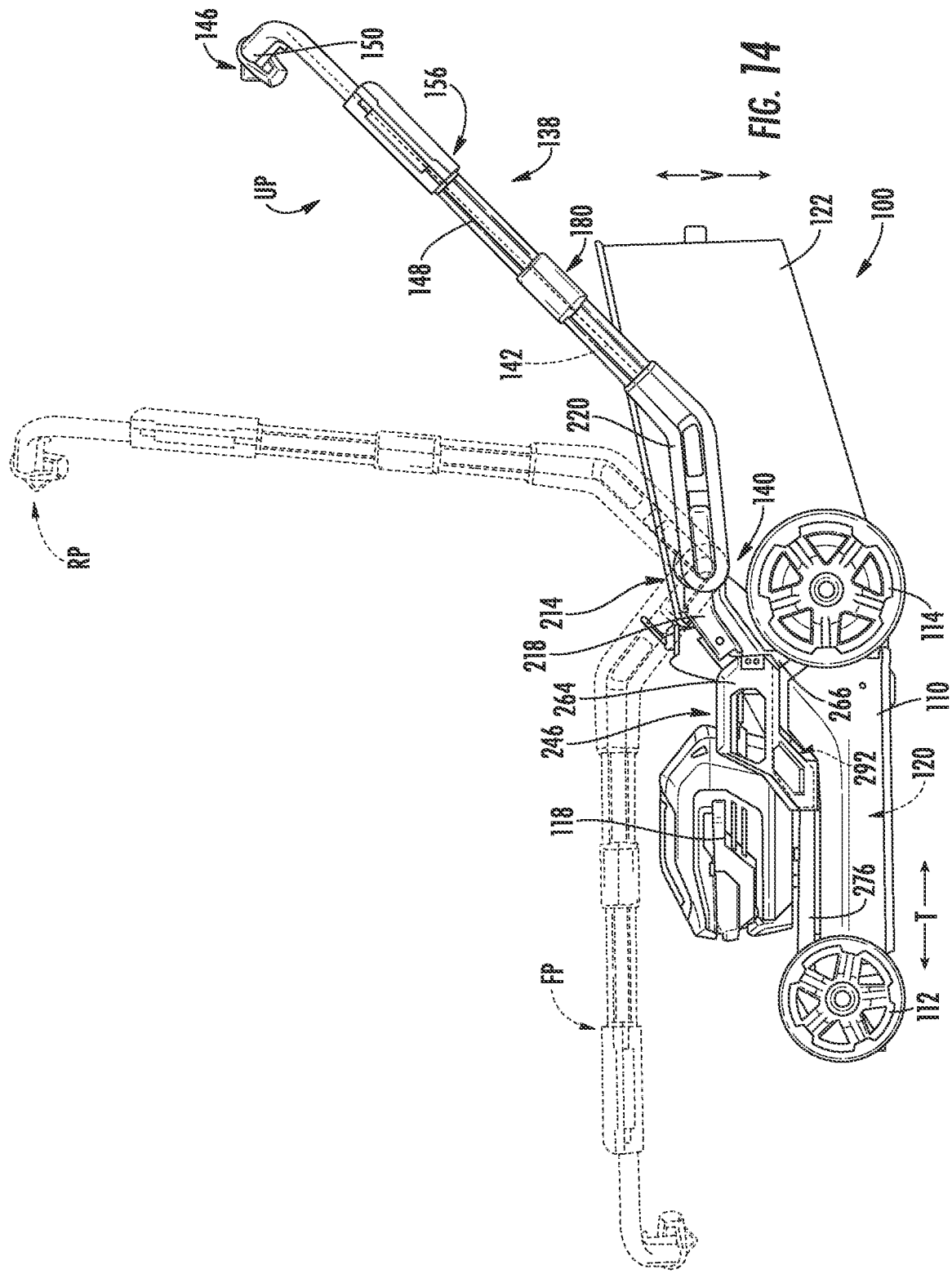
FIG. 14 provides a side, perspective view of a lawnmower according to exemplary embodiments of the present disclosure.
Figure 15:
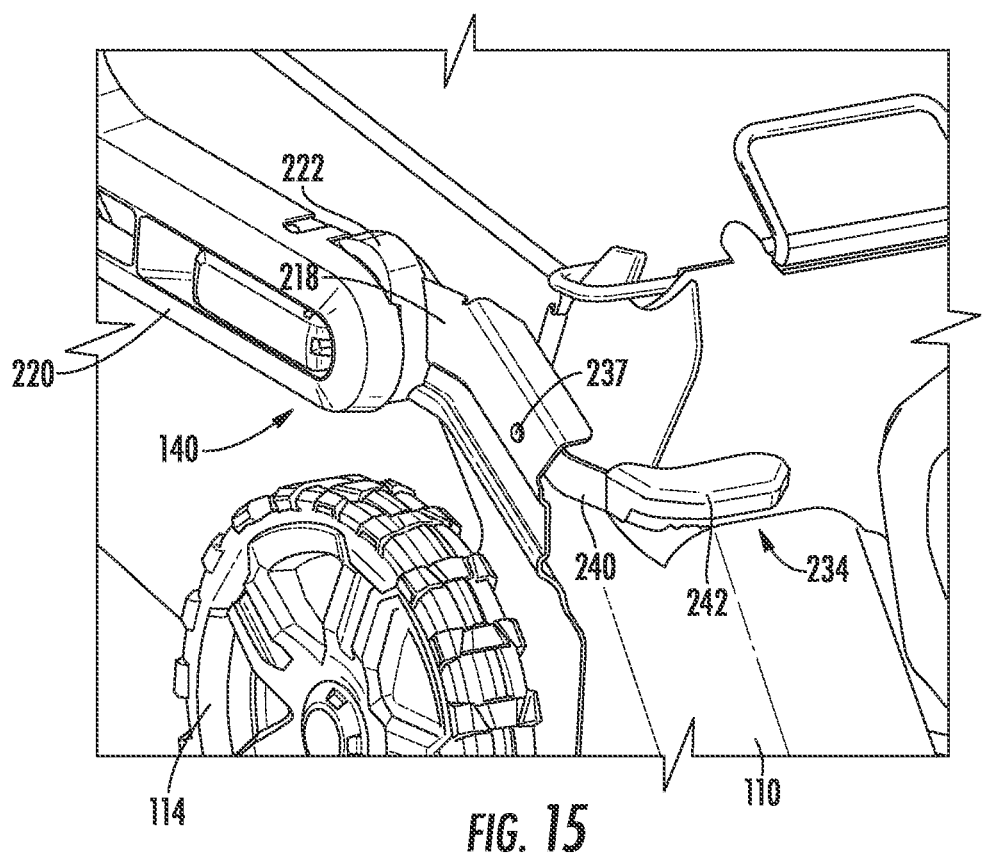
FIG. 15 provides a perspective view of a storage-angle assembly of the handle assembly on a lawnmower appliance according to exemplary embodiments of the present disclosure.
Figure 16:
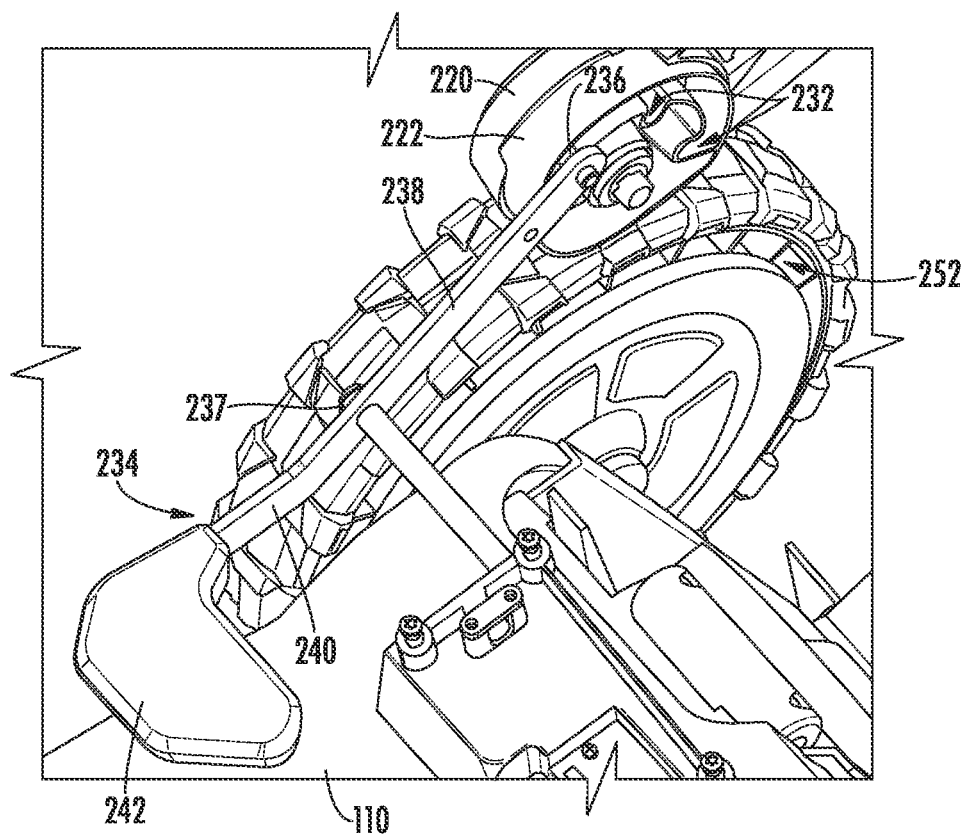
FIG. 16 provides a perspective view of the storage-angle assembly of FIG. wherein a portion of the assembly has been removed for the sake of clarity.
Figure 17:
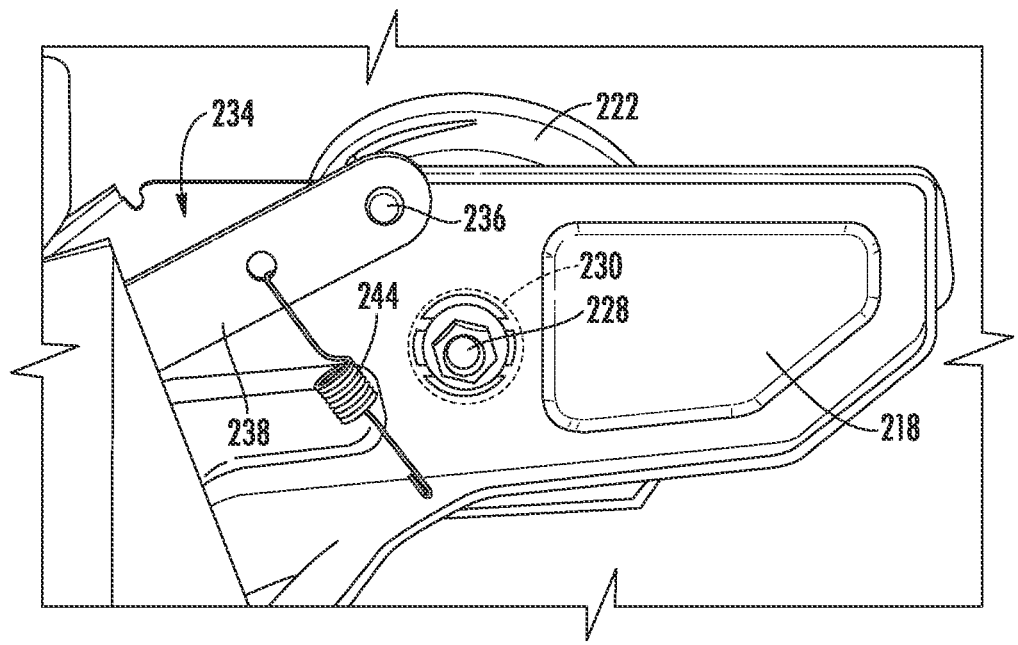
FIG. 17 provides a perspective view of the storage-angle assembly of FIG. wherein a portion of the assembly has been removed for the sake of clarity.
Figure 18:
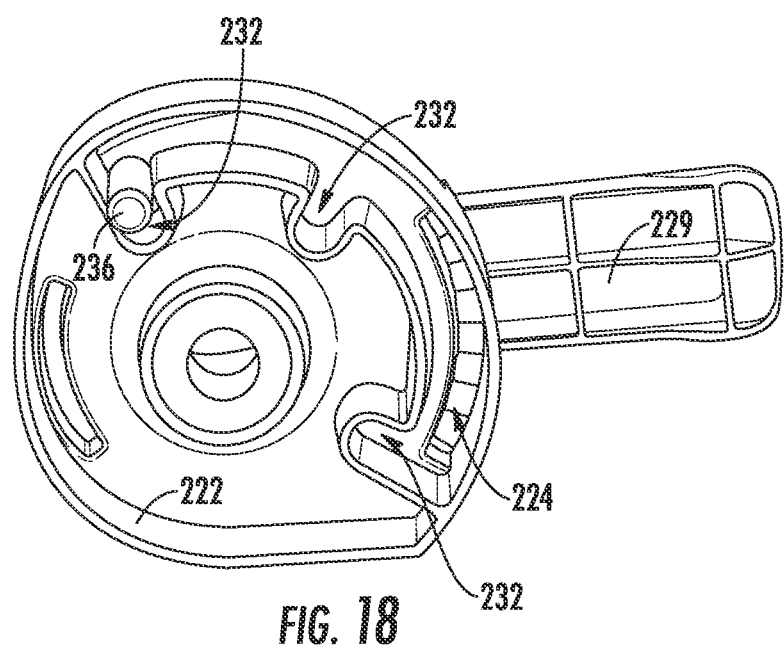
FIG. 18 provides a perspective view of the storage-angle assembly of FIG. wherein a portion of the assembly has been removed for the sake of clarity.
Figure 19:
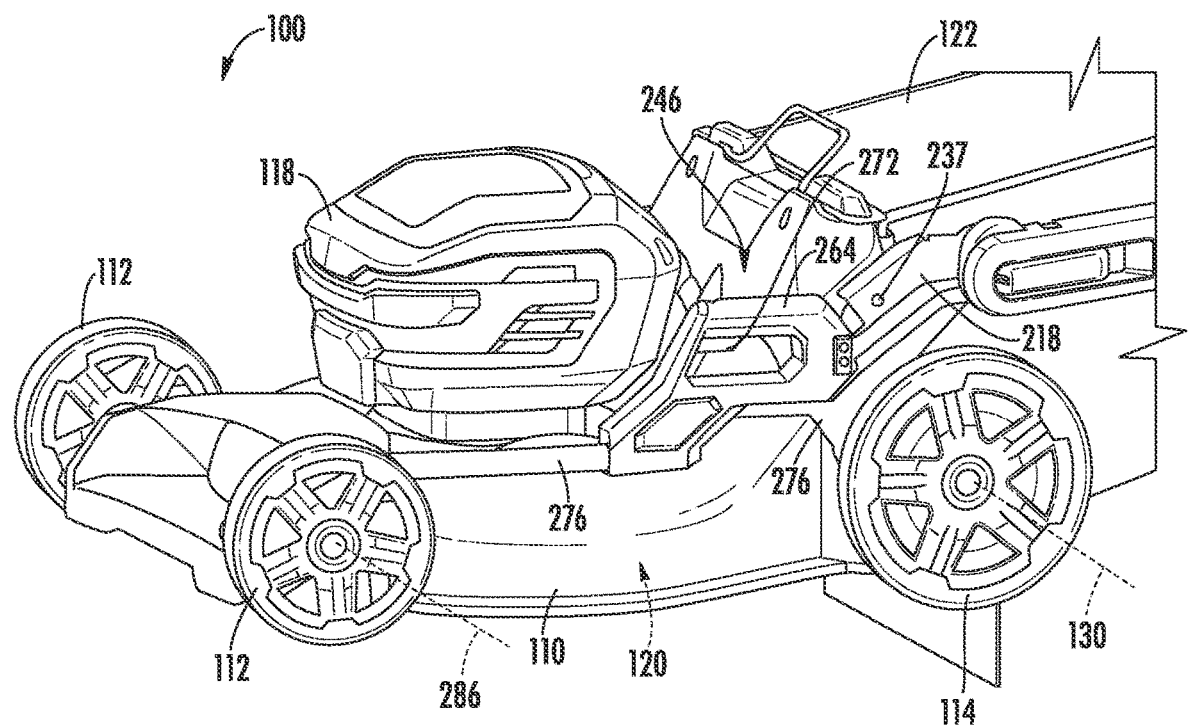
FIG. 19 provides a perspective view of a variable-height assembly of the handle assembly on a lawnmower appliance according to exemplary embodiments of the present disclosure.
Figure 20:
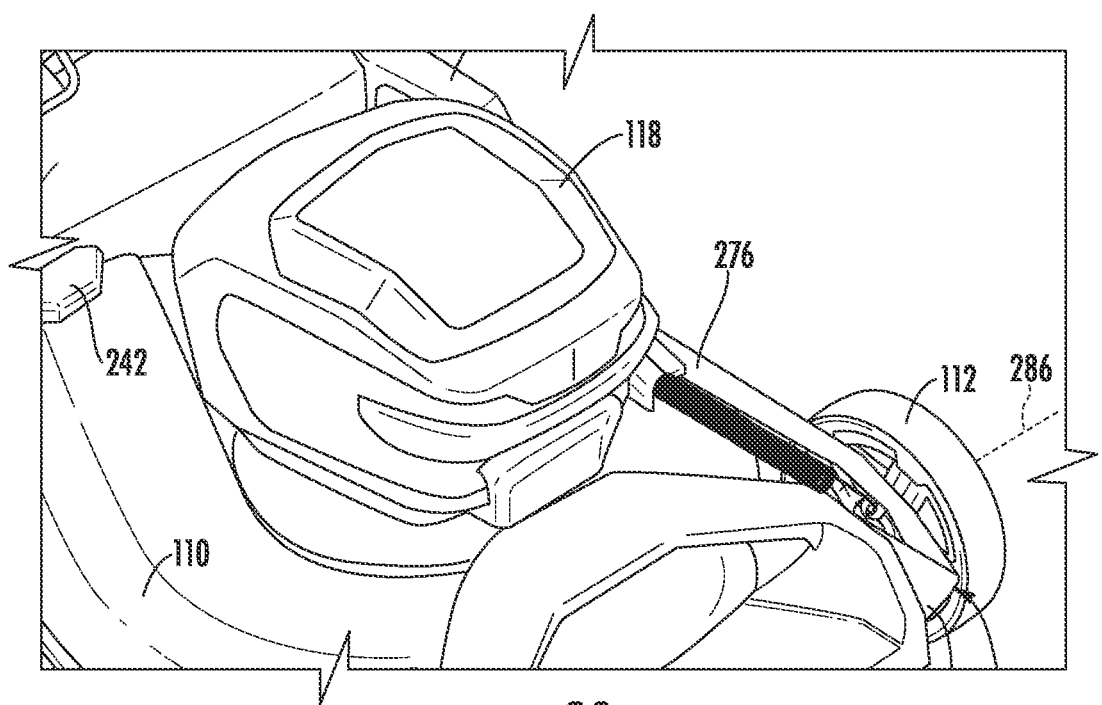
FIG. 20 provides another perspective view of the variable-height assembly of FIG. 19.
Figure 21:
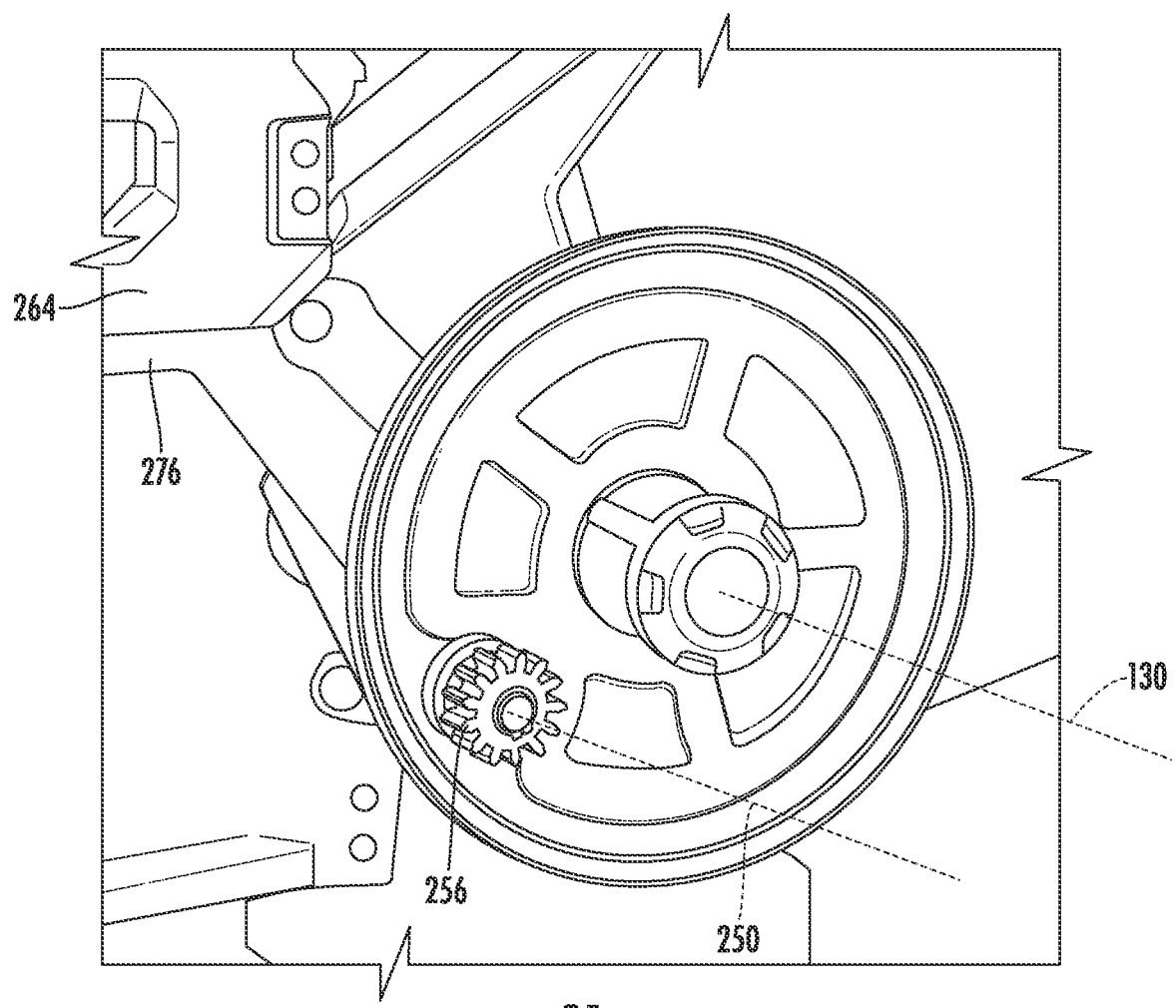
FIG. 21 provides a perspective view of the variable-height assembly of FIG. 19, wherein a portion of the assembly has been removed for the sake of clarity.
Figure 22:
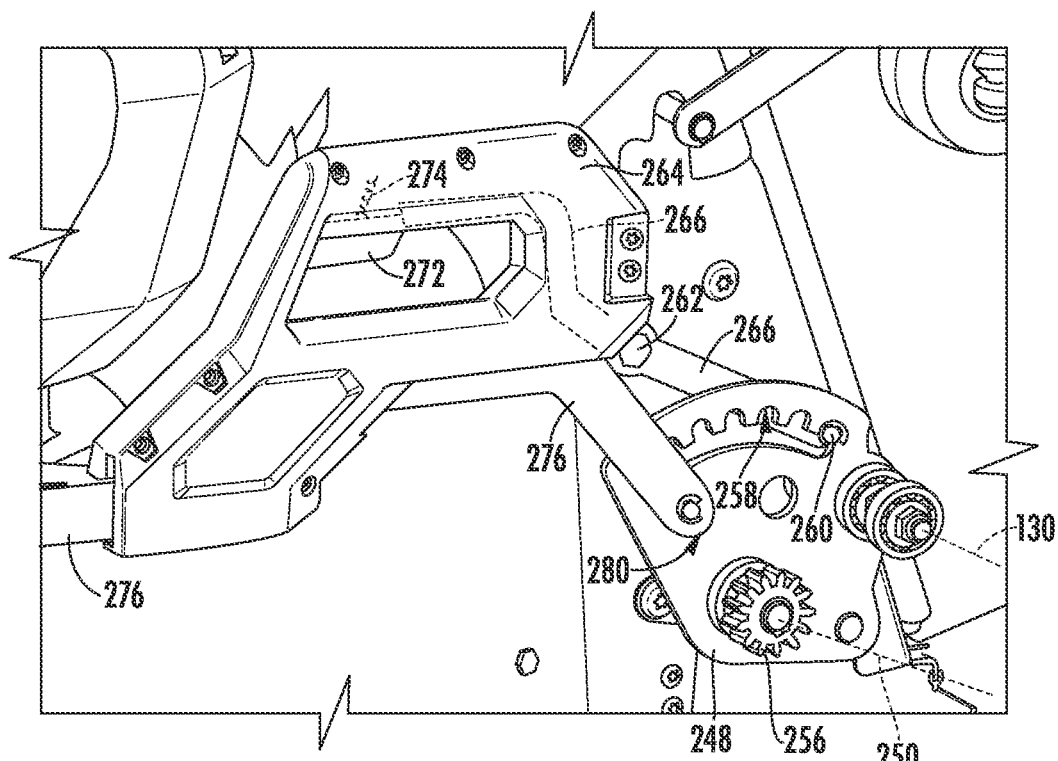
FIG. 22 provides another perspective view of the variable-height assembly of FIG. 19, wherein another portion of the assembly has been removed for the sake of clarity.
Figure 23:
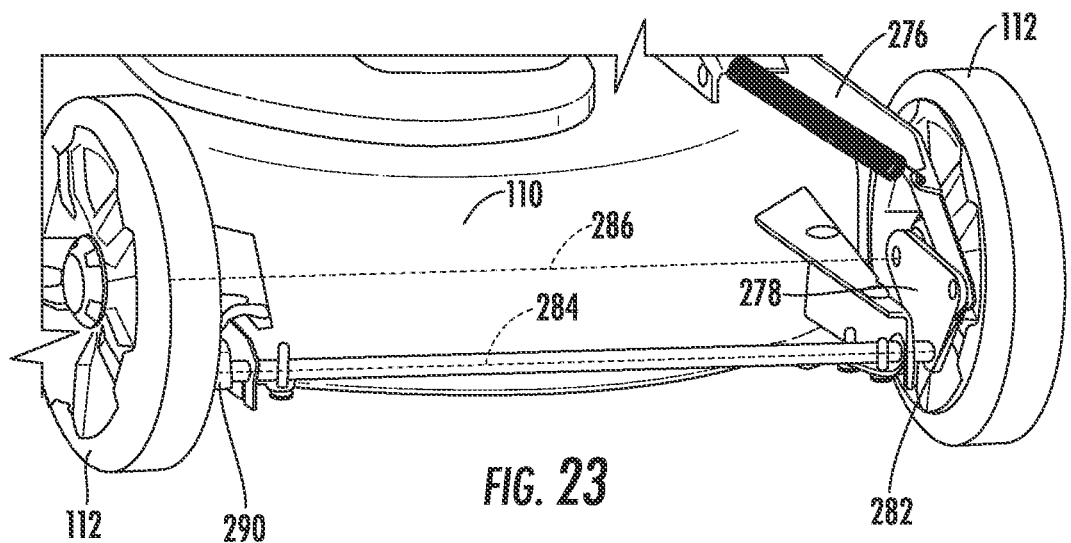
FIG. 23 provides a prospective front view of a variable-height assembly of the handle assembly on a lawnmower appliance according to exemplary embodiments of the present disclosure.

In some embodiments, a bracket clamp 227 selectively clasps intermediate cup 222 and handle bracket 220 (e.g., such that intermediate cup 222 and handle bracket 220 are held together and the pair of interface ridges 224, 226 are enmeshed). Bracket clamp 227 may include a clamp pin 228 that extends (e.g., laterally) through handle bracket 220 and intermediate cup 222. On one lateral end of clamp pin 228, a cam latch 229 may be provided. On the other lateral end of clamp pin 228, a retention flange 230 may be provided. Thus, handle bracket 220 and intermediate cup 222 may be sandwiched (e.g., laterally) between cam latch 229 and retention flange 230. When assembled, cam latch 229 may be selectively pivoted (e.g., perpendicular to the handle rotation axis 216) between a clasped position (e.g., as illustrated in FIG. 9) and a released position (not pictured). In the clasped position, an eccentric lobed surface of cam latch 229 may be held against handle bracket 220 and force handle bracket 220 and intermediate cup 222 together. In the released position, the eccentric lobed surface of cam latch 229 may be held away from handle bracket 220, permitting lateral separation between handle bracket 220 and intermediate cup 222. Optionally, a clamp spring 231 may be located about clamp pin 228 in biased engagement to provide a separating force between handle bracket 220 and intermediate cup 222 (or retention flange 230).

In embodiments including multiple lateral arms 148, multiple support brackets 218 may be provided such that a discrete support bracket 218 corresponds to each lateral arm 148. Optionally, each lateral arm 148 may include a discrete handle bracket 220 fixed to a corresponding lateral arm 148. For instance, a handle bracket 220 may receive a portion of telescoping tube 182 proximal to base chassis 110. Additionally or alternatively, a discrete intermediate cup 222 is located between each support bracket 218 and handle bracket 220.

Turning to FIGS. 14 through 18, some embodiments provide for multiple unique attached positions of handle frame 138 on base chassis 110. For instance, along with an attached-use position (indicated at UP), one or more attached-stow positions may be provided. In the illustrated embodiments, the attached-stow positions include an attached-vertical position (indicated in phantom lines at RP) and an attached forward-position (indicated in phantom lines at FP).

In certain embodiments, intermediate cup 222 defines a unique catch groove 232 corresponding to each attached position. In the illustrated embodiments, for example, multiple catch grooves 232 are defined within intermediate cup 222 (e.g., on the opposite lateral side from the cup ridges 224). Each catch groove 232 is spaced apart from the others (e.g., circumferentially about the handle rotation axis 216). A fastening lever 234 having a latch finger 236 selectively holds handle frame 138 in a given attached position. For instance, latch finger 236 may be selectively received within catch groove 232 corresponding to the given attached position. In optional embodiments, fastening lever 234, including latch finger 236, is pivotable about a lever pin 237 (e.g., parallel to handle rotation axis 216). Moreover, fastening lever 234 may include multiple lever arms 238, 240 extending radially from lever pin 237. For instance, latch finger 236 may be fixed to one lever arm 238 while a lever pedal 242 is fixed to another lever arm 240 (e.g., for selectively pivoting fastening lever 234 about lever pin 237). Additionally or alternatively, a lever spring 244 (e.g., tension spring) may bias fastening lever 234 toward engagement with intermediate cup 222, or otherwise motivate latch finger 236 toward a catch groove 232 circumferentially aligned with latch finger 236. In some such embodiments, one end of lever spring 244 is fixed to fastening lever 234 (e.g., a lever arm 238 thereof), while the opposite end of lever spring 244 is fixed to support bracket 218 (or another portion of base chassis 110). When assembled, a user may engage lever pedal 242 to pivot latch finger 236 (e.g., upward) away from a catch groove 232, thereby permitting intermediate cup 222 and handle bracket 220 to rotate (e.g., about handle rotation axis 216). In turn, a separate catch groove 232 may be rotated into alignment with latch finger 236. Moreover, lever pedal 242 may be released such that the biasing force of lever spring 244 motivates latch finger 236 into the aligned catch groove 232 and handle frame 138 is secured in a corresponding attached position.

Turning now to FIGS. 1 and 15 through 23, exemplary embodiments of lawnmower 100 include a height-adjustment assembly 246 for selectively altering the vertical height of base chassis 110 relative to the ground. In particular, height-adjustment assembly 246 may selectively raise or lower base chassis 110 by moving one or more of the plurality of wheels 112, 114 between multiple unique height settings. In some such embodiments, a wheel bracket 248 supporting one or more wheels (e.g., rear wheel 114) is fixed to base chassis 110. For instance, wheel bracket 248 may be defined at a rear portion of base chassis 110 in support of at least one of the rear wheels 114. In turn, the corresponding rear wheel 114 may be rotatably mounted on wheel bracket 248 (e.g., to rotate about the wheel axis 130). In some such embodiments, wheel bracket 248 defines a height-adjustment axis 250 about which wheel bracket 248 can selectively rotate. As shown, wheel bracket 248 may be parallel to the wheel axis 130 and spaced apart therefrom. Wheel axis 130 may be fixed relative to base chassis 110 such that the corresponding wheel, including wheel axis 130, is rotatable about height-adjustment axis 250. As the corresponding wheel rotates about height-adjustment axis 250, the vertical position of the wheel relative to base chassis 110 may thus be altered. Optionally, a joiner bar may extend laterally from wheel bracket 248 to connect wheel bracket 248 to a mated bracket 252 fixed to base chassis 110 on the opposite lateral side. Similar to wheel bracket 248, the mated bracket 252 may be rotatably mounted about height-adjustment axis 250 and support a corresponding wheel (e.g., rear wheel 114). Thus, mated bracket 252 and its corresponding rear wheel 114 may rotate about the height-adjustment axis 250 in tandem or unison with wheel bracket 248 and its own corresponding rear wheel 114.

In some embodiments, the rear wheels 114 are fixed to wheel bracket 248 and mated bracket 252. Optionally, the rear wheels 114 may be further provided as the propulsion wheels, which are mechanically coupled to propulsion motor 128. In some such embodiments, one or both of the rear wheels 114 includes a plurality of internal driven teeth 254 enmeshed with a corresponding drive gear 256 coupled to propulsion motor 128. Drive gear 256 may be coaxial with height-adjustment axis 250 and rotate about the same. During use, propulsion motor 128 may rotate each drive gear 256, which in turn, acts to rotate the corresponding propulsion wheel.

Wheel bracket 248 generally defines a plurality of unique height settings for the corresponding wheel (e.g., rear wheel 114 and its opposite rear wheel 114). For instance, wheel bracket 248 may define a plurality of bracket slots 258, each bracket slot 258 corresponding to a discrete height setting. As shown, each bracket slot 258 is spaced apart from the others (e.g., circumferentially about the height-adjustment axis 250). In some such embodiments, a selection rail 266 having an adjustment latch 260 selectively holds wheel bracket 248 in a given height setting. For instance, adjustment latch 260 may be selectively received within the bracket slot 258 corresponding to a given height setting. As shown, selection rail 266 extends from a first engagement end 268 to a second engagement end 270. Second engagement end 270 holds adjustment latch 260 while a pivot pin 262 pivotably fixes selection rail 266 to base chassis 110 between first engagement end 268 and second engagement end 270. In turn, selection rail 266, including adjustment latch 260, may be pivotable about pivot pin 262 (e.g., parallel to the height-adjustment axis 250) to selectively alter the height setting of the wheels 112, 114.

In certain embodiments, an adjustment handle 264 holds at least a portion of selection rail 266. For instance, first engagement end 268 of selection rail 266 may pivotably extend through adjustment handle 264. Optionally, selection rail 266 may be fixed (e.g., at first engagement end 268) to a trigger 272 movably mounted to adjustment handle 264. Trigger 272 may thus be actuated to direct rotation of selection rail 266. For instance, trigger 272 may be mounted to a bottom-facing surface of adjustment handle 264 such that pulling upward against trigger 272 may cause the first engagement end 268 of selection rail 266 to pivot upward while the second engagement end 270 pivots downward (e.g., away from bracket slots 258). In certain embodiments, a selection spring 274 (e.g., compression spring) can bias selection rail 266 toward engagement with wheel bracket 248, or otherwise motivate adjustment latch 260 toward a bracket slot 258 circumferentially aligned with adjustment latch 260. When assembled, a user may engage trigger 272 to pivot adjustment latch 260 (e.g., downward) away from a bracket slot 258, thereby permitting wheel bracket 248 to rotate (e.g., about height-adjustment axis 250). In turn, another bracket slot 258 may be rotated into alignment with adjustment latch 260. Moreover, trigger 272 may be released such that the biasing force of selection spring 274 motivates adjustment latch 260 into the aligned bracket slot 258 and the wheel (e.g., rear wheel 114) is secured in a corresponding height setting.

In certain embodiments, a support rail 276 extends from wheel bracket 248 (e.g., transversely) to another wheel (e.g., a front wheel 112). Specifically, support rail 276 may extend from wheel bracket 248 to a secondary bracket 278 upon which another wheel (e.g., a front wheel 112) is mounted. In some such embodiments, support rail 276 extends from a first pivotable end 280 (e.g., mounted to wheel bracket 248)

to a second pivotable end 282 (e.g., mounted to secondary bracket 278). In further embodiments, a rail spring (e.g., tension spring) is mounted in biased engagement with support rail 276 to, for instance, motivate support rail rearward. As an example, the rail spring may be fixed on one end to base chassis 110 (e.g., directly or through an intermediate tab that is stationary relative to base chassis 110) and at another end to support rail 276 (e.g., proximal to secondary bracket 278). Notably, the rail spring may assist with contraction of height-adjustment assembly 246 and, thereby, lifting of lawnmower 100 when adjusting the height thereof.

When assembled, secondary bracket 278 defines a secondary axis 284 about which secondary bracket 278 is rotatable. Secondary axis 284 may be spaced apart from the wheel mounted to secondary bracket 278 (e.g., front wheel 112) and a passive wheel axis 286 defined thereby. For example, the secondary axis 284 may be radially spaced from the passive wheel axis 286 and corresponding wheel (e.g., front wheel 112). Thus, the secondary axis 284 may be parallel to the passive wheel axis 286 without being coaxial with the passive wheel axis 286. Additionally, the second pivotable end 282 of support rail 276 may be radially spaced apart from the secondary axis 284, such that transverse movement of support rail 276 translates to rotational movement of secondary bracket 278 about secondary axis 284.

Optionally, a joiner bar may extend laterally from secondary bracket 278 to connect secondary bracket 278 to a mated passive-wheel bracket 290 fixed to base chassis 110 on the opposite lateral side. Similar to secondary bracket 278, mated passive-wheel bracket 290 may be rotatably mounted about secondary axis 284 and support a corresponding wheel (e.g., front wheel 112). Thus, mated passive wheel bracket 248 and its corresponding front wheel 112 may rotate about the secondary axis 284 in tandem or unison with secondary bracket 278 and its own corresponding front wheel 112.

As shown, support rail 276 may extend through adjustment handle 264. For instance, at least a portion of support rail 276 between the first pivotable end 280 and the second pivotable end 282 may be held on or within adjustment handle 264 (e.g., below trigger 272). In some such embodiments, the portion of support rail 276 within adjustment handle 264 is a non-linear segment that extends at least partially in the vertical direction V (e.g., a non-linear dogleg 190), restricting transverse movement of support rail 276 relative to adjustment handle 264. Advantageously, adjustment handle 264 may be moved according to a single, fluid, and predetermined roto-translational motion to selectively adjust the height at each of the plurality of wheels 112, 114.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A lawnmower comprising:
    a base chassis;
    a first wheel;
    a height-adjustment assembly disposed between the base chassis and the first wheel to selectively raise and lower the base chassis, wherein the height-adjustment assembly comprises:
        a wheel bracket comprising a plurality of bracket slots, wherein the wheel bracket is rotatable about a height-adjustment axis, and wherein each of the plurality of bracket slots is spaced apart circumferentially about the height-adjustment axis;
        a selection rail adjustably coupled to the plurality of bracket slots; and
        an adjustment handle comprising a trigger coupled to the selection rail, wherein actuating the trigger releases the selection rail from one of the plurality of bracket slots to permit rotation of the wheel bracket when the adjustment handle is moved in a predetermined roto-translational motion.

2. The lawnmower of claim 1, wherein the selection rail comprises a first engagement end and a second engagement end, wherein the first engagement end is coupled to the trigger, wherein the second engagement end comprises an adjustment latch interfacing with the plurality of bracket slots, and wherein the selection rail is coupled to the base chassis at a pivot pin disposed between the first and second engagement ends.

3. The lawnmower of claim 1, wherein the first wheel comprises a plurality of internal driven teeth enmeshed with a corresponding drive gear coupled to a propulsion motor, and wherein the drive gear is coaxial with the height-adjustment axis.

4. The lawnmower of claim 1, further comprising a second wheel, wherein the first wheel is a rear wheel of the lawnmower and the second wheel is a front wheel of the lawnmower, and wherein the second wheel is coupled to the base chassis through a secondary bracket rotatable relative to the base chassis.

5. The lawnmower of claim 4, wherein the wheel bracket and the secondary bracket are coupled together by a support rail.

6. The lawnmower of claim 5, wherein the support rail is motivated in a rear direction toward the rear wheel by a rail spring to assist in lifting the base chassis.

7. The lawnmower of claim 1, wherein the lawnmower further comprises a mated bracket disposed on an opposite lateral side of the base chassis as compared to the wheel bracket, wherein the mated bracket is rotatable about the height-adjustment axis, and wherein the mated bracket is disposed between the base chassis and a third wheel, the third wheel being a rear wheel of the lawnmower.

8. The lawnmower of claim 7, wherein the wheel bracket and the mated bracket are coupled together through a joiner bar.

9. The lawnmower of claim 1, wherein the predetermined roto-translation motion is in a rearward direction of the lawnmower to raise the base chassis.

10. A height-adjustment assembly for a lawnmower, the height-adjustment assembly comprising:
    a wheel bracket comprising a plurality of bracket slots, wherein the wheel bracket is rotatable about a height-adjustment axis, and wherein each of the plurality of bracket slots is spaced apart circumferentially about the height-adjustment axis;
    a selection rail adjustably coupled to the plurality of bracket slots; and
    an adjustment handle comprising a trigger coupled to the selection rail, wherein actuating the trigger releases the selection rail from one of the plurality of bracket slots to permit rotation of the wheel bracket when the adjustment handle is moved in a predetermined roto-translational motion, wherein the height-adjustment assembly is configured to be rotationally coupled to a base chassis of the lawnmower and rotatable relative to the base chassis about the height-adjustment axis.

11. The height-adjustment assembly of claim 10, wherein the selection rail comprises a first engagement end and a second engagement end, wherein the first engagement end is coupled to the trigger, wherein the second engagement end comprises an adjustment latch interfacing with the plurality of bracket slots, and wherein the selection rail is configured to be coupled to the base chassis at a pivot pin disposed between the first and second engagement ends.

12. The height-adjustment assembly of claim 10, wherein the height-adjustment assembly further comprises a mated bracket configured to be disposed on an opposite lateral side of the base chassis as compared to the wheel bracket, wherein the mated bracket is rotatable about the height-adjustment axis, and wherein the mated bracket is configured to be disposed between the base chassis and a second wheel, the second wheel being a rear wheel of the lawnmower.

13. The height-adjustment assembly of claim 10, wherein the wheel bracket is configured to support a rear wheel of the lawnmower, wherein the height-adjustment assembly further comprises a secondary bracket configured to support a front wheel of the lawnmower, wherein the secondary bracket is configured to rotate relative to the base chassis about a secondary axis, and wherein the wheel bracket and the secondary bracket are coupled together by a support rail such that the wheel bracket and secondary bracket rotate about the height-adjustment and secondary axis at a same time.

14. The height-adjustment assembly of claim 10, wherein the predetermined roto-translation motion is in a forward or rearward direction.

15. A method of adjusting a height of a base chassis of a lawnmower, the method comprising:
with the base chassis at a first height, actuating a trigger of a height-adjustment assembly to unlock a selection rail from a first bracket slot of a wheel bracket, wherein the wheel bracket rotationally supports a first wheel;

moving an adjustable handle in a predetermined roto-translation motion to align the selection rail with a second bracket slot of the wheel bracket, the second bracket slot being different than the first bracket slot;

releasing the trigger to engage the selection rail with the second bracket slot and lock the base chassis at a second height different from the first height.

16. The method of claim 15, wherein moving the adjustable handle to raise the base chassis is performed with assistance of a rail spring, the rail spring motivating the adjustable handle in a rearward direction.

17. The method of claim 15, wherein actuating the trigger and moving the adjustable handle are both performed simultaneously using a single hand.

18. The method of claim 15, wherein the lawnmower further comprises a secondary bracket rotationally supporting a second wheel, wherein the first wheel is a rear wheel and the second wheel is a front wheel, and wherein moving the adjustable handle causes a support rail coupled to the secondary bracket to simultaneously rotate the secondary bracket.

19. The method of claim 15, wherein the selection rail comprises a first engagement end and a second engagement end, wherein the first engagement end is coupled to the trigger, wherein the second engagement end comprises an adjustment latch interfacing with the first and second bracket slots, and wherein the selection rail is coupled to the base chassis at a pivot pin disposed between the first and second engagement ends.

20. The method of claim 15, wherein the lawnmower further comprises a mated bracket disposed on an opposite lateral side of the base chassis as compared to the wheel bracket, wherein the mated bracket is rotatable about the height-adjustment axis, wherein the mated bracket is disposed between the base chassis and a third wheel, the third wheel being a rear wheel of the lawnmower, and wherein moving the adjustable handle causes the mated bracket to rotate about the height-adjustment axis.

\* \* \* \* \*